US012045592B2

(12) United States Patent
Clement et al.

(10) Patent No.: US 12,045,592 B2
(45) Date of Patent: Jul. 23, 2024

(54) SEMI-SUPERVISED TRANSLATION OF SOURCE CODE PROGRAMS USING NEURAL TRANSFORMERS

(71) Applicant: MICROSOFT TECHNOLOGY LICENSING, LLC., Redmond, WA (US)

(72) Inventors: Colin Bruce Clement, Seattle, WA (US); Dawn Drain, Bellevue, WA (US); Neelakantan Sundaresan, Bellevue, WA (US); Alexey Svyatkovskiy, Bellevue, WA (US); Chen Wu, Beijing (CN)

(73) Assignee: Microsoft Technology Licensing, LLC., Redmond, WA (US)

( * ) Notice: Subject to any disclaimer, the term of this patent is extended or adjusted under 35 U.S.C. 154(b) by 403 days.

(21) Appl. No.: 17/213,174

(22) Filed: Mar. 25, 2021

(65) Prior Publication Data

US 2022/0308848 A1 Sep. 29, 2022

(51) Int. Cl.
G06F 9/44 (2018.01)
G06F 8/51 (2018.01)
G06N 3/063 (2023.01)
G06N 3/088 (2023.01)

(52) U.S. Cl.
CPC ............. G06F 8/51 (2013.01); G06N 3/063 (2013.01); G06N 3/088 (2013.01)

(58) Field of Classification Search
None
See application file for complete search history.

(56) References Cited

U.S. PATENT DOCUMENTS

| 11,798,534 | B2* | 10/2023 | Wang ....................... G06N 3/08 |
| 2016/0092764 | A1* | 3/2016 | Burchard ............... G06N 3/006 706/19 |
| 2017/0139690 | A1 | 5/2017 | Pesarese et al. |
| 2020/0034436 | A1* | 1/2020 | Chen ........................ G06N 3/08 |
| 2020/0225915 | A1* | 7/2020 | Wong ...................... G06N 3/08 |
| 2020/0327118 | A1* | 10/2020 | Ahmed .................... G06N 3/08 |
| 2021/0027025 | A1* | 1/2021 | Olabiyi .................. G10L 15/063 |
| 2021/0264109 | A1* | 8/2021 | Srinivasan ............ G06F 40/166 |
| 2021/0390270 | A1* | 12/2021 | Fei .......................... G06N 3/045 |

(Continued)

FOREIGN PATENT DOCUMENTS

CN 112732264 A 4/2021

OTHER PUBLICATIONS

CN10956045, English text (Year: 2020).*

(Continued)

*Primary Examiner* — Insun Kang

(57) ABSTRACT

An automated system for translating source code written in one programming language into a different programming language utilizes a neural transformer with attention trained on semi-supervised data. The model is jointly pre-trained with a masked language model objective and an autoregressive objective on a large unsupervised source code corpus to learn to comprehend the syntactic structure and semantics of source code. The pre-trained model is then fine-tuned with a token-type prediction objective and an autoregressive objective on supervised translation tasks and data augmented tasks to learn to translate source code from one programming language into a different programming language.

13 Claims, 14 Drawing Sheets

(56) References Cited

U.S. PATENT DOCUMENTS

2021/0405980 A1* 12/2021 Ghosh ................. G06F 8/51
2022/0067307 A1* 3/2022 Rei ................. G06F 40/289
2022/0206785 A1* 6/2022 Singh ................. G06F 8/51

OTHER PUBLICATIONS

CN 106126507, English text (Year: 2019).*
CN 111597824, English text (Year: 2020).*
CN109635270 (Year: 2019).*
Guo et al., Incorporating BERT into Parallel Sequence Decoding with Adapters, Oct. 13, 2020 arXiv (Year: 2020).*
Chi et al. (Cross-Lingual Natural Language Generation via Pre-Training), 2020 (Year: 2020).*
Hassan et al., Neural Machine Based Mobile Applications Code Translation (Year: 2020).*
Guo et al., Jointly Masked Sequence-to-Sequence Model for Non-Autoregressive Neural Machine Translation. (Year: 2020).*
Jain, et al., "Contrastive Code Representation Learning", In Repository of arXiv:2007.04973v4, Oct. 9, 2020, 20 Pages.
Le, et al., "Deep Learning for Source Code Modeling and Generation: Models, Applications and Challenges", In Repository of arXiv:2002.05442, Feb. 13, 2020, 37 Pages.
"International Search Report and Written Opinion issued in PCT Application No. PCT/US22/018593", Mailed Date : May 23, 2022, 12 Pages.
Svyatkovskiy, et al., "Intellicode Compose: Code Generation Using Transformer", In Proceedings of the 28th ACM Joint Meeting on European Software Engineering Conference and Symposium on the Foundations of Software Engineering, Nov. 8, 2020, pp. 1433-1443.
Tan, et al., "Neural Machine Translation: A Review of Methods Resources, and Tools", In Repository of https://arxiv.org/abs/2012.15515, Dec. 31, 2020, 20 Pages.
Alon, et al., "Code2vec: Learning Distributed Representations of Code", In Proceedings of the ACM on Programming Languages, vol. 3, No. Popl. Article 40, Jan. 2, 2019, 29 Pages.
Bahdanau, et al., "Neural Machine Translation by Jointly Learning to Align and Translate", In Journal of Computing Research Repository, Sep. 1, 2014, 15 Pages.
Bi et al., "Palm: Pre-training an autoencoding&autoregressive Language Model for Context-Conditioned Generation", In Journal of Computing Research Repository, Apr. 14, 2020, 11 Pages.
Brown, et al., "Language Models are Few-Shot Learners", In Journal of Advances in Neural Information Processing Systems, Dec. 6, 2020, 75 Pages.
Chen, et al., "Keyphrase Enhanced Diverse Beam Search: A Content-Introducing Approach to Neural Text Generation", In Journal of IEEE Access, vol. 7, May 30, 2019, pp. 72716-72725.
Deaton, et al., "Transformers and Pointer-Generator Networks for Abstractive Summarization", Retrieved From: https://web.stanford.edu/class/archive/cs/cs224n/cs224n.1194/reports/custom/15784595.pdf. 2019. 9 Pages.
Gu et al., "Incorporating Copying Mechanism in Sequence-to-Sequence Learning", In Journal of Computing Research Repository, Mar. 21, 2016, 12 Pages.
Husain, et al., "CodeSearchNet Challenge Evaluating the State of Semantic Code Search", In Journal of Computing Research Repository, Sep. 20, 2019, 6 Pages.
Lachaux, et al.. "Unsupervised Translation of Programming Languages", In Journal of Computing Research Repository, Jun. 5, 2020, 21 Pages.
Li, et al., "A Simple, Fast Diverse Decoding Algorithm for Neural Generation", In Journal of Computing Research Repository. Nov. 25, 2016, 11 Pages.
Och, Franz Josef, "Minimum Error Rate Training in Statistical Machine Translation", In Proceedings of 41st Annual Meeting on Association for Computational Linguistics, vol. 1, Jul. 7, 2003, 8 Pages.
Radford, et al., "Improving Language Understanding by Generative Pre-Training". Retrieved from: https://www.cs.ubc.ca/~amuham01/LING530/papers/radford2018improving.pdf, Jun. 11, 2018, 12 Pages.
See, et al., "Get to the point: Summarization with Pointer-Generator Networks", In Proceedings of the 55th Annual Meeting of the Association for Computational Linguistics, Jul. 30, 2017, 20 Pages.
Vaswani, et al., "Attention Is All You Need", In Journal of Computing Research Repository, Jun. 12, 2017, 15 Pages,.
Vinyals, et al., "Pointer Networks", In Proceedings of the Neural Information Processing Systems, Dec. 7, 2015, 9 Pages.

* cited by examiner

SEMI-SUPERVISED TRANSLATION OF SOURCE CODE PROGRAMS USING NEURAL TRANSFORMERS

BACKGROUND

Advances in the design of computer hardware has led to the need for new programming languages that can support the new features of the latest computer design. At times it may not be possible to retrofit a legacy programming language to support the new hardware features leading computer scientists to develop a new programming language. Existing programs written in the legacy programming language may be translated into the new programming language.

A source code transcompiler is one technique for translating source code written in one programming language into semantically-equivalent source code in a different programming language. Traditional approaches rely on a one-to-one relationship between the source programming language and the target programming language and utilize rewrite rules tailored to perform the translation from the source programming language to the target programming language.

However, generating a transcompiler is often not practical. The task requires an expertise in both programming languages where there may be limited expertise in legacy programming languages (e.g., COBOL, Fortran, PL/I). In addition, the task is further complicated since different programming languages have different grammars and syntactic structures, and rely on distinctive platform APIs, standard-library functions, and type systems that vary across multiple programming languages.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A neural transformer model with attention ("model") translates a source code snippet (e.g., method, program, class, etc.) written in one programming language into a different programming language. The neural transformer model is jointly pre-trained using a masked language objective and an autoregressive objective on a large monolingual unsupervised source code corpus to learn to comprehend source code. The model is then fine-tuned on supervised translation tasks using a token-type objective and an autoregressive objective to learn to translate source code from one programming language to a different programming language.

A translation engine performs a beam search that uses the model to generate at most k translation candidate sequences for a given input source code snippet. A ranking engine filters out those translation candidate sequences that are not syntactically correct, too long or too short. The remaining translation candidate sequences are ranked based on a forward probability, backward probability, bilingual syntactic similarity, and language probability.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
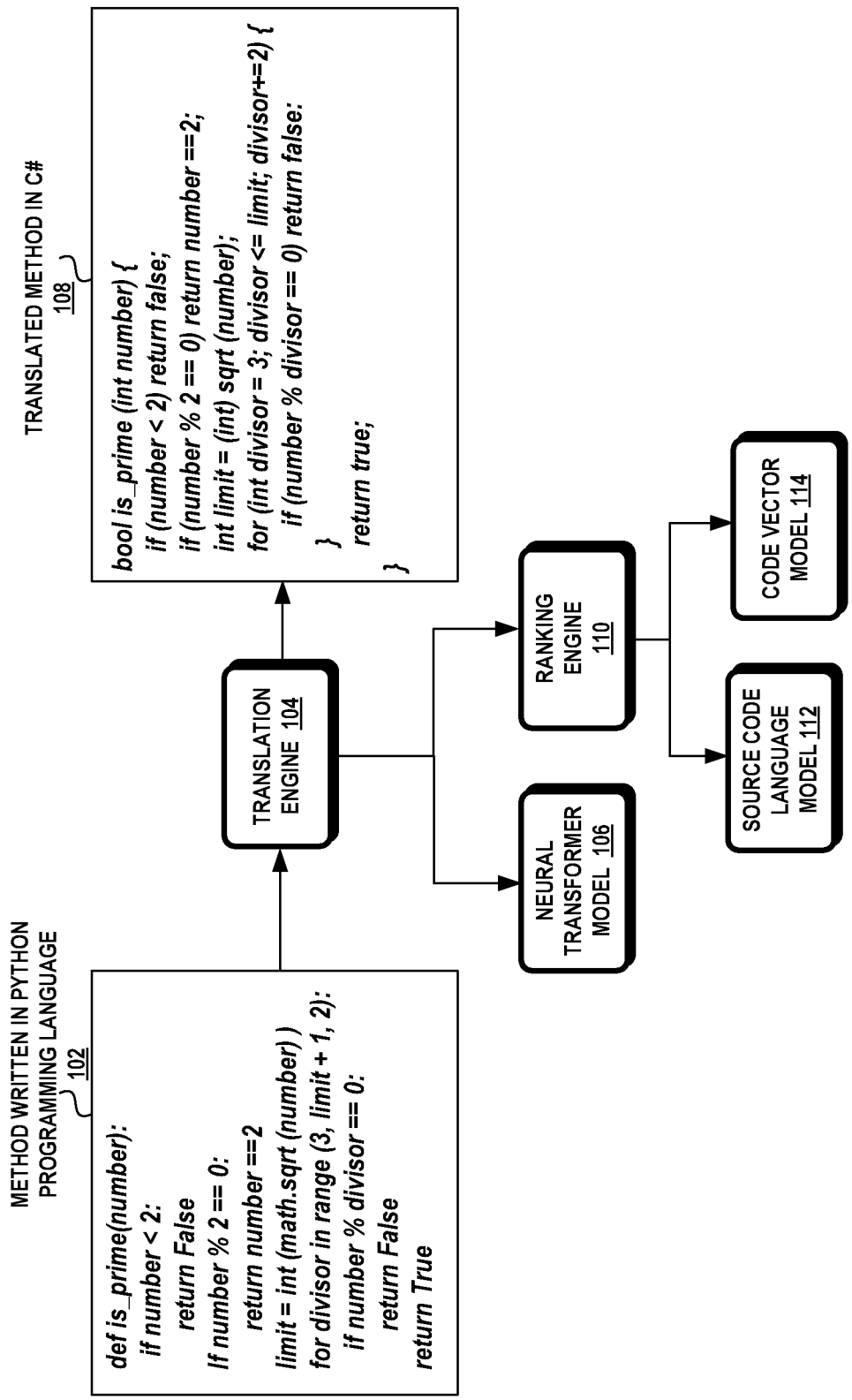
FIG. 1 illustrates an exemplary source code translation system, using a translation engine based on a neural transformer with attention, to translate a method written in Python into the C# programming language.

The subject matter disclosed pertains to a source-to-source translator (i.e., transcompiler, transpiler, source-to-source compiler) based on a neural transformer model with attention. The model is jointly pre-trained with a masked language model objective and an autoregressive objective on a large monolingual unsupervised source code corpus to learn to comprehend source code. The pre-trained model is then fine-tuned with a token-type prediction objective and an autoregressive objective on supervised translation tasks and data-augmented translation tasks to learn to translate source code from one programming language into another programming language.

The neural transformer model is structured in an encoder-decoder configuration. During pre-training, the encoder and decoder are jointly trained on a source code snippet written in a first programming language represented as an ordered sequence of tokens and masked tokens. The ordered sequence of tokens is partitioned into a first segment containing an initial portion of the tokens with a remaining segment including the masked tokens that follow the initial portion. The encoder learns to reconstruct the masked tokens by encoding the sequence bidirectionally to learn to comprehend the meaning of the unmasked tokens and the full context of the sequence. This training optimizes the cross-entropy loss between the encoder's output, which includes predicted tokens for the masked tokens, and the full context of the sequence. Simultaneously, the decoder is trained to autoregressively learn to predict the masked tokens that follow the first segment of tokens input to the encoder.

The fine-tuning trains the pre-trained neural transformer model on translation tasks having known pairs of correctly-translated source code and on translation tasks of a large corpus of source code, without known translations, using back translations. The encoder and decoder are jointly trained on an ordered sequence of tuples that represent a source code snippet. A tuple includes a token and its corresponding token type. The encoder learns to comprehend the syntactic structure of a programming language by representing the input code snippet as a sequence of real-valued vector embeddings, the quality of which are judged by a masked prediction head layer. The output hidden states from the encoder are also fed into a decoder which learns to interpret them as tokens of the remaining code.

The trained model is then used to translate a given source code snippet written in one programming language into a semantically-equivalent source code snippet in a different programming language. A translation engine performs the translation by performing a beam search that uses the model to generate at most k translation candidate sequences for a given input source code snippet. The set of translation candidate sequences are filtered to eliminate those translation candidate sequences that are not syntactically correct, too long or too short. The remaining translation candidate sequences are ranked based on a forward probability, backward probability, bilingual syntactic similarity, and language probability.

Attention now turns to a more detailed description of the system, components, devices, and methods for a semi-supervised source code translation.

Neural Transformer Source Code Translation System

FIG. 1 is an illustration depicting an exemplary translation using the source-to-source neural transformer translator. A source code method, is prime, written in the Python programming language 102, is translated into a semantically-equivalent method in the C# programming language 108 using a translation engine 104 that utilizes a neural transformer model 106. The translation engine 104 also includes a ranking engine 110 that filters and ranks the translation candidate sequences in order to generate the most accurate translations. The ranking engine 110 includes a source code language model 112 and a code vector model 114.

Neural transformers with attention are one distinct type of machine learning models. Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence.

Attention now turns to a description of the training of the neural transformer model.

Training the Neural Transformer Model

Figure 2:
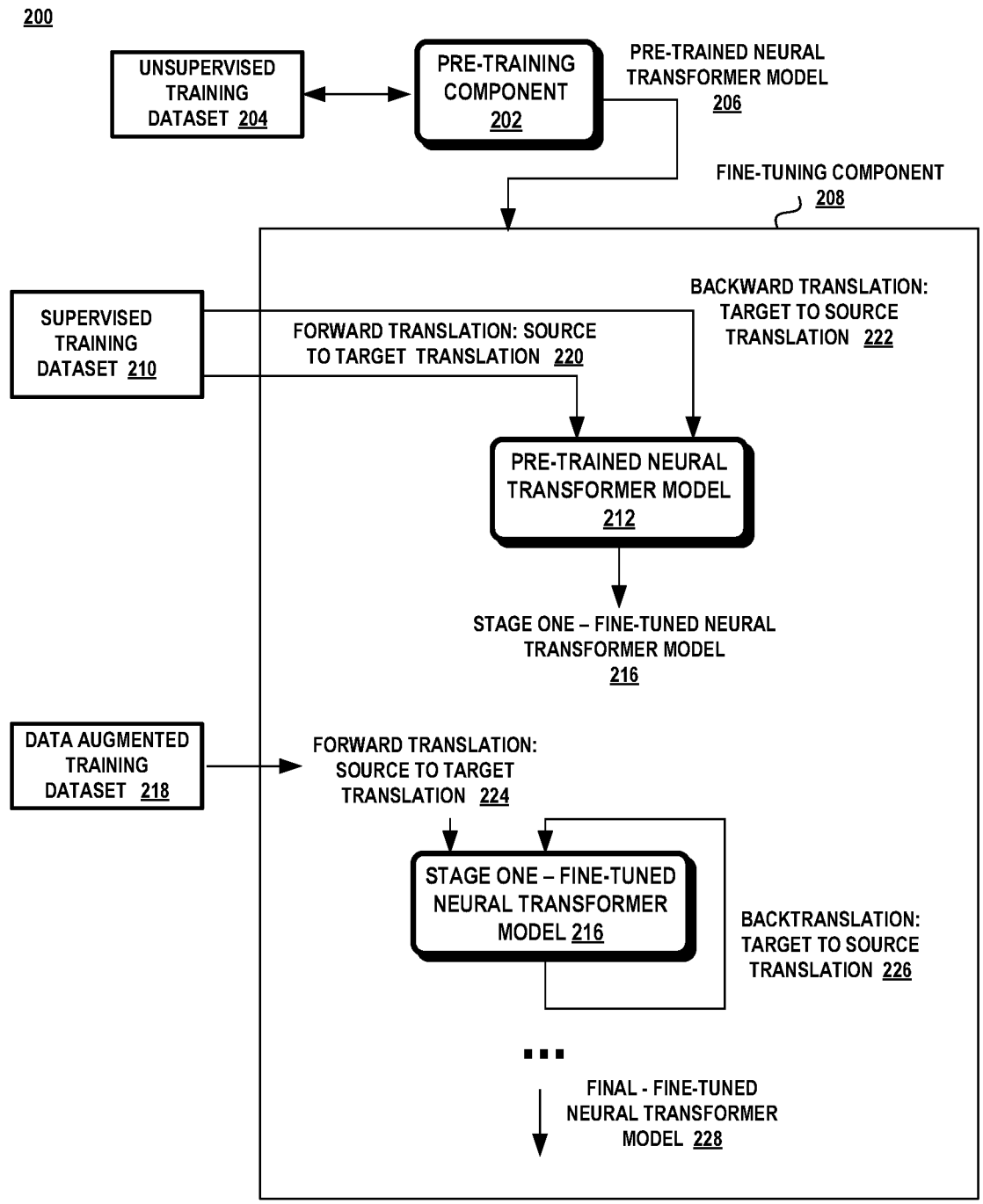
FIG. 2 illustrates an exemplary configuration of the training phases of the neural transformer model for source code translation.

Referring to FIG. 2, there is shown an exemplary system 200 for training the neural transformer model. A pre-training component 202 trains a pre-training configuration of the model on an unsupervised set of source code snippets 204 written in a single programming language to learn the syntactic structure and semantics of source code generally. The pre-trained model 206 is then fine-tuned by the fine-tuning component 208 using a supervised set of source code snippets having known translations 210 and a set of data-augmented source code snippets having back translations.

The pre-training model maximizes the log likelihood of the source code snippets from the decoder's output and the masked token reconstruction between the encoder's output and original input. The joint objective function is represented mathematically as follows:

$$L_{pretrain} = L_{AE} + L_{AR}$$

$$L_{AE}(\theta, X) = \frac{1}{|X|} \sum_{x \in X} \log P(x^u \mid x^{\setminus u}; \theta)$$

$$L_{AR}(\theta, (X, Y)) = \sum_{(x,y) \in (X,Y)} \log \prod_{t=1}^{n} P(y_t \mid y_{<t}, x; \theta)$$

where $L_{AE}$ is the mask prediction task, $L_{AR}$ is generation task (i.e., autoregressive task), $x^u$ denotes the masked token, X is the first 80% of the tokens of an input sequence and Y is the remaining 20% of tokens of an input sequence.

In a first fine-tuning stage, a supervised training dataset 210 contains pairs of source code snippets written in a first programming language 220 with a known translation in a second programming language 222. Fine-tuning the model initially with a small supervised training dataset is necessary to enhance the stability of the subsequent unsupervised training process by providing better initial conditions for the unsupervised fine-tuning stage. The first fine-tuning stage changes the domain knowledge of the model from masked language modeling and generation of noisy source code into the translation task at hand.

In a second fine-tuning stage, the model 216 is trained on an unsupervised set of data-augmented training data 218 that consists of a source code snippet in one programming language 224 and its corresponding back translation 226. A back translation is the translation generated by the neural transformer model. This fine-tuning stage overcomes the lack of large-scale, parallel, supervised pairs of code snippets, allowing the model to learn to translate using only a large corpus of two or more programming languages which are not at all known to correspond to one-another.

The fine-tuning objective being minimized for both fine-tuning stages is the sum of the cross-entropy between the token-types predicted by token-type encoder layer and the true token types, and the cross-entropy between the true translated token sequence and the predicted token sequence probabilities. This joint objective function is represented mathematically as below:

$$L_{finetune} = L_{Label} + L_{Trans}$$

$$L_{Label}(\theta, (X, \text{Label})) = \frac{1}{|X|} \sum_{x \in X} \log P \prod_{i=1}^{l} (\text{label}_i \mid x_i; \theta)$$

$$L_{Trans}(\theta, (X, Y)) = \sum_{(x,y) \in (X,Y)} \log \prod_{t=1}^{n} P(y_t \mid y_{<t}, x; \theta)$$

where Label is the token-type sequence which is the same length as the input X, where X is an instance in source language and Y is the corresponding target language. The result of the fine-tuning is a model 228 that is configured to translate a source code snippet from one programming language to another programming language. While the model can be evaluated to translate source code languages it has not seen, it can only target the translations to languages it has been trained on, as a control code is required to instruct the model which language is the target programming language for translation.

Figure 3:
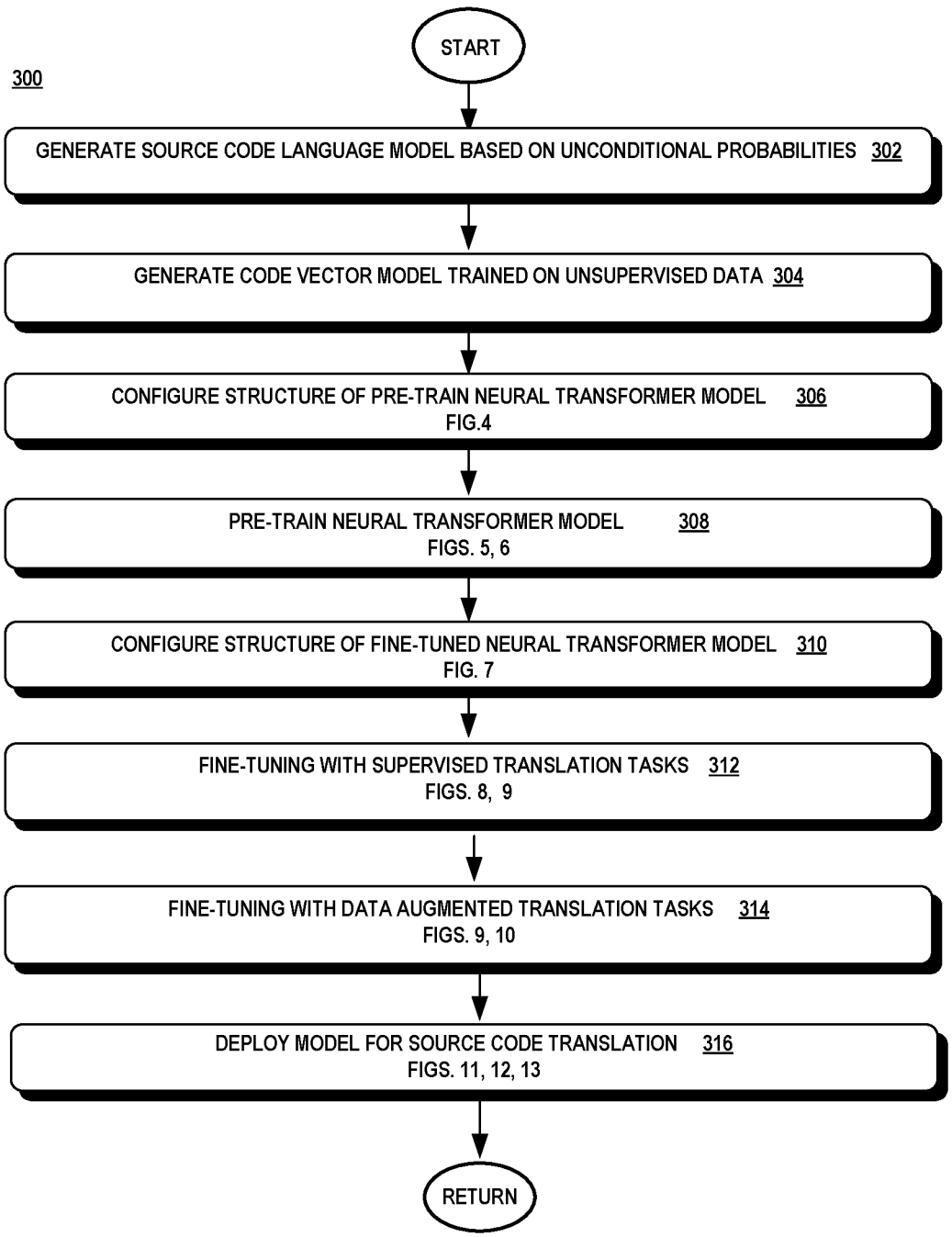
FIG. 3 is a flow chart illustrating an exemplary method for training and deploying the neural transformer model with attention for source code translation.

FIG. 3 illustrates an exemplary method for training and deploying the neural transformer model 300. The translation process utilizes a ranking technique that relies on a source code language model based on unconditional probabilities and a code vector model. Initially, these models are generated in addition to the configurations of the neural transformer model for pre-training, fine-tuning, and translation.

A source code language model 112 may be generated or alternatively, obtained from an existing source. The source code language model 112 may be generated by training a decoder neural transformer model on large corpora of source code of multiple programming languages, for the purpose of ranking the likelihood of translations predicted by the translation model. A decoder neural transformer model contains decoder blocks and not encoder blocks. (Collectively, block 302).

Additionally, a code vector model is generated or alternatively, obtained from an existing source. A code vector model is a neural network that represents a source code snippet as a fixed-length code vector or code embedding. The code vector model is based on the paths through the abstract syntax tree representation of the source code snippet. The neural network of the code vector model learns to aggregate the various syntactic paths in the abstract syntax tree into a single fixed-length vector. In one aspect, the code vector model is the Code2Vec model. (Collectively, block 304).

The code vector model 114 is generated from source code snippets, such as methods, written in various programming languages which are obtained from various source code repositories. Each source code snippet is parsed into an abstract syntax tree. The source code snippet is associated with a label, such as method name, tag, caption or other type of label. The label represents the semantic property that the source code snippet is associated with. The neural network learns the label distribution inferred from the syntactic paths in the abstract syntax tree of the source code snippet. The resulting code vectors are then used to determine the similarity between a source code snippet input to the neural transformer model and its translated counterpart which is discussed in more detail below. (Collectively, block 304).

Initially, the structure of the pre-trained model is configured (block 306) and the pre-trained model is trained with an unsupervised set of source code methods (block 308). The structure of the pre-trained model is then reconfigured for the fine-tuning tasks (block 310) and the fine-tuned model is trained with a supervised set of translation tasks (block 312) and a data-augmented set of translation tasks (block 314). The fine-tuned model is then deployed for translation in a target environment (block 316).

Attention now turns to a more detailed discussion of the structure of the pre-trained model.

Pre-Training Architecture of Neural Transformer Model

Figure 4:
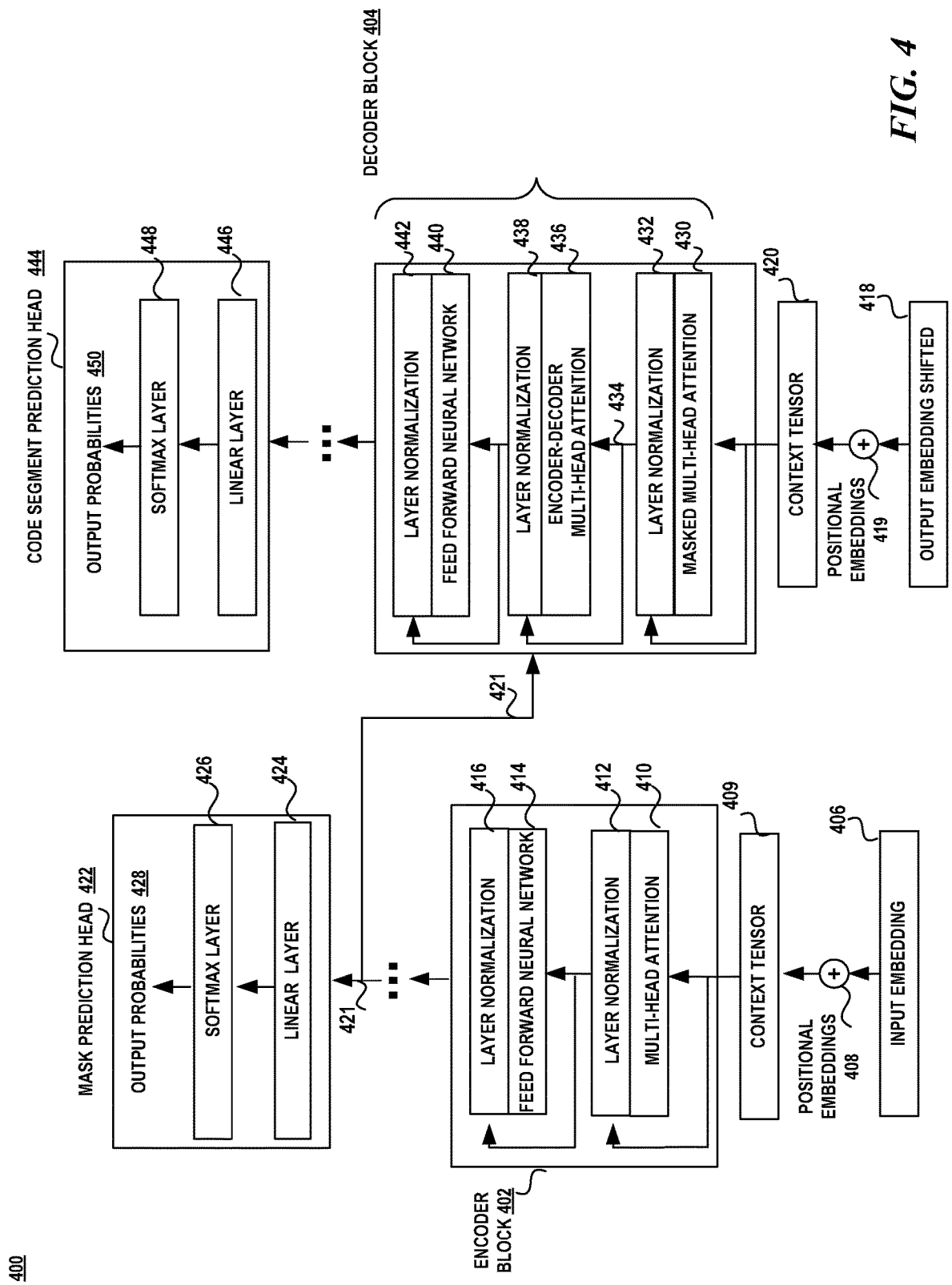
FIG. 4 is a schematic diagram illustrating an exemplary configuration of the pre-training architecture of the neural encoder transformer model.

FIG. 4 shows an exemplary architecture of the pre-trained neural transformer model. The pre-trained architecture of the neural transformer model 400 contains one or more encoder blocks 402 coupled to one or more decoder blocks 404.

The initial inputs to an encoder block 402 are the input embeddings 406 of an input sequence of the training dataset. In one aspect, the input embeddings contain two segments. The first segment contains the embeddings representing a contiguous sequence of the initial 80% of the tokens in an input sequence and the second segment contains embeddings representing the masked tokens that replaced the remaining contiguous sequence of 20% of the tokens in the input sequence. The encoder learns to predict the masked tokens and the decoder learns to predict the second segment of tokens conditioned on the context represented by the first segment.

In order to retain the order of the tokens in the input sequence, positional embeddings 408 are added to the input embedding 406 forming a context tensor 409. The initial inputs to the decoder block 404 are a shifted sequence of the output embeddings 418 from the previous time step to which the positional embeddings 419 are added forming context tensor 420.

An encoder block 402 consists of two layers. The first layer includes a multi-head attention component 410 followed by layer normalization component 412. The second layer includes a feed-forward neural network 414 followed by a layer normalization component 416. The context tensor 409 is input into the multi-head attention layer 410 of the encoder block 402 with a residual connection to layer normalization 412. The output of the layer normalization 412 is input to the feed forward neural network 414 with another residual connection to layer normalization 416. The output of the encoder block 402 is a set of hidden representations 421. The set of hidden representations 421 is then sent through additional encoder blocks. At the last encoder block, the set of hidden representations 421 is sent to the trained decoder 404 and the mask prediction head 422.

The mask prediction head 422 generates output probabilities of the tokens likely to replace the masked tokens in the input embedding. The mask prediction head 422 consists of a linear layer 424 and a softmax layer 426. The linear layer 424 is a neural network that projects the hidden states produced by the stack of encoders into a logits vector. The softmax layer 426 converts the logits vector into the output probabilities 428.

Attention is used to decide which parts of the input sequence are important for each token, especially when decoding long sequences since the encoder is limited to encoding a fixed-size vector. Attention mechanisms gather information about the relevant context of a given token and then encode that context into a vector which represents the token. It is used to identity the relationships between tokens in the long sequence while ignoring other tokens that do not have much bearing on a given prediction.

The multi-head attention component 410 takes a context tensor 409 and weighs the relevance of each token represented in the context tensor 409 to each other by generating attention weights for each token in the input embedding 406. In one aspect, the attention function is scaled dot-product attention which is described mathematically as follows:

$$\text{Attention } (Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one token in a sequence, K is the vector representations of all tokens in the sequence, and V is the vector representations of all the tokens in the sequence.

The queries, keys and values are linearly projected h times in parallel with $d_v$ output values which are concatenated to a final value:

MultiHead(Q,K,V)=Concat(head$_1$, . . . ,head$_h$)$W^O$, where head$_i$=Attention($QW_i^Q, KW_i^K, VW_i^V$)

with parameter matrices ($QW_i\in \mathbb{R}^{d_{model}\times d_k}$, $W_i^K\in \mathbb{R}^{d_{model}\times d_k}$, $W_i^V\in \mathbb{R}^{d_{model}\times d_k}$, and $W^O\in \mathbb{R}^{hd_v\times d_{model}}$.

In order to reduce the training time of the neural transformer, layer normalization is used between the layers. The layer normalization component normalizes the inputs across the features. The mean and standard deviation is computed across the feature dimensions. There is a first layer normalization 412 that precedes the feed forward neural network 414 and a second layer normalization 416 that follows the feed forward neural network 414.

The feed-forward neural network 414 processes each output encoding separately. The output of the top encoder block is a set of attention vectors K and V 421 which is used by the encoder-decoder multi-head attention layer 436 of the decoder block 404 and the mask prediction head 422.

The decoder block 404 predicts each token $t_i$ in the target programming language one-by-one at each time step conditioned on all previously-generated target tokens $t_1, \ldots, t_{i-1}$. Initially, the decoder block receives a language identifier symbol that identifies the target programming language to the decoder.

A decoder block 404 consists of three layers. The first layer includes a masked multi-head attention component 430 followed by a layer normalization component 432. The output of the layer normalization component 432 is input into the encoder-decoder multi-head attention component 436 with a residual connection to layer normalization component 438. The second layer includes an encoder-decoder multi-head attention component 436 followed by a layer normalization component 438. The third layer includes a feed forward neural network 440 followed by a layer normalization component 442. The output of layer normalization component 438 is input into the feed forward neural network 440 with a residual connection to layer normalization component 442.

The masked multi-head attention component 430 receives the output embeddings of the previous timestep. The masked multi-head attention component 430 masks the output embeddings from future time steps. The encoder-decoder multi-head attention layer 436 receives queries from the previous decoder layer 434 and the memory keys and values 421 from the output of the encoder block 402. In this manner, the decoder block 404 can attend to every position of the input sequence. The feed-forward neural network 440 processes each output encoding separately. A layer normalization component 432, 438, 442 is used between the layers in order to normalizes the inputs across the features.

In the pre-training configuration of the neural transformer, a code segment prediction head 444 is used to predict the next token that follows the input embedding 406. The input embedding contained a portion of the entire context with the masked tokens representing the remaining portion of the context. The code segment prediction head 444 includes a linear layer 446 and a softmax layer 448 that generates the output probabilities 450. The linear layer 446 is a neural network that projects the vector produced by the stack of decoders into a logits vector. The softmax layer 448 then turns the scores of the logits vector into probabilities 450 for each token in the vocabulary which are positive and normalized.

In one aspect, the neural transformer model contains a stack of six encoder blocks and a stack of six decoder blocks which are aggregated into a neural transformer block. The output of each encoder block is passed onto the next encoder block and processed. Each decoder block receives the attention weights computed from the last encoder block. The use of multiple stacked encoder blocks and decoder blocks increases the model's capacity allowing the model to learn increasing levels of abstraction.

Pre-Training the Neural Transformer Model

Attention now turns to a discussion on pre-training the neural transformer model in the pre-training configuration.

Figure 5:
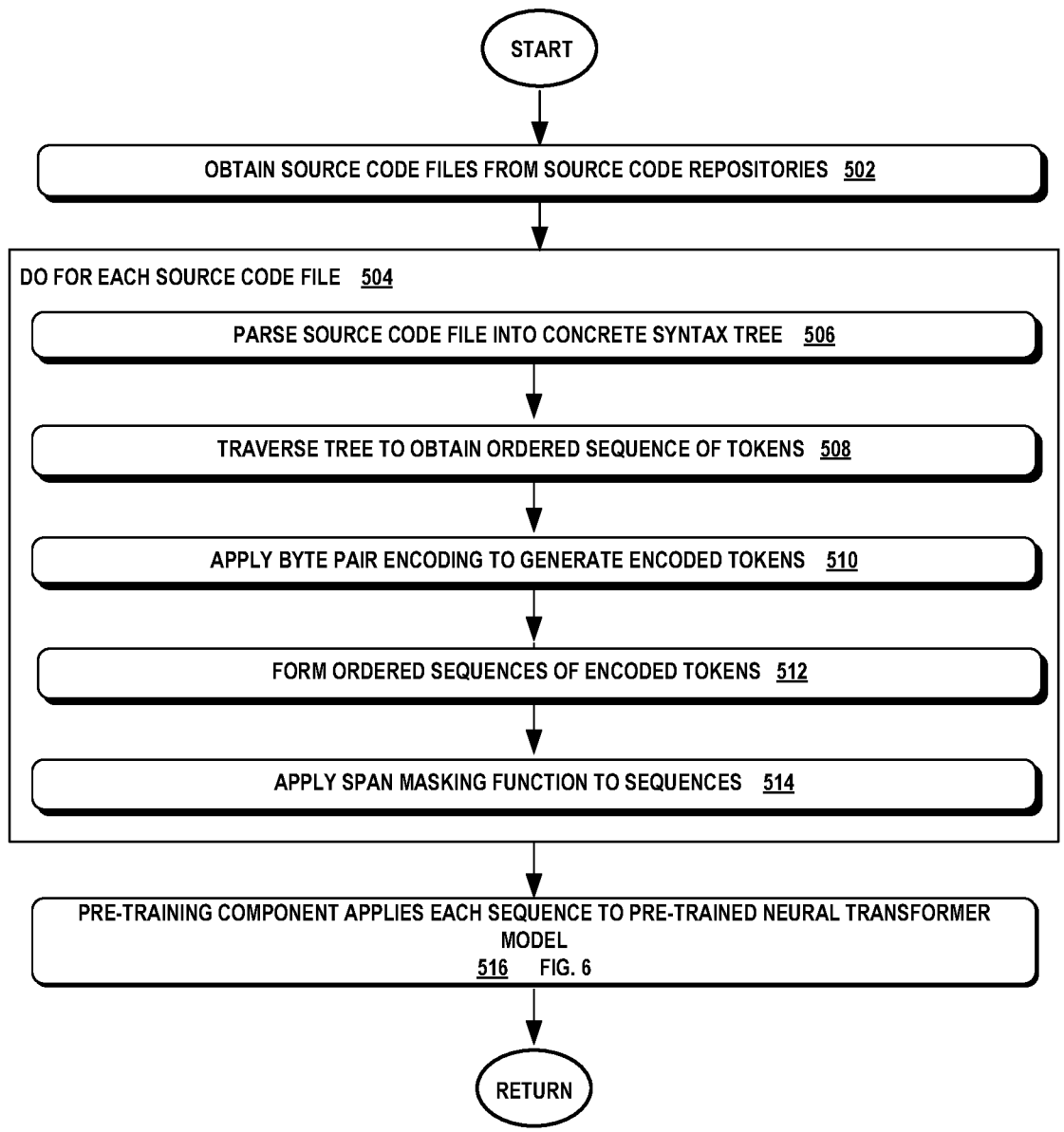
FIG. 5 is a flow chart illustrating an exemplary method for pre-training the neural transformer model.

Turning back to FIG. 5, there is shown a method 500 for generating a training dataset to pre-train the neural transformer model. The pre-training component 202 obtains a diverse corpus of unlabeled source code programs or files from various source code repositories. This is referred to as unsupervised learning since the model draws inferences from the input data without labeled responses. (Collectively, block 502).

A source code repository may be a file archive and web hosting facility that stores large amounts of source code either privately or publicly. A source code repository can be structured as a version control system, such as GIT, Mercurial, etc. The source code files residing in the source code repository vary and may be written in different programming languages. The selected source code files can come from different domains, such as without limitation, scientific computing, web development, dataflow programming, machine learning, and the like. (Collectively, block 502).

The pre-training component 202 transforms each of the selected source code files into a concrete syntax tree (blocks 504, 506). The concrete syntax tree represents the source code text in the parsed form. The concrete syntax tree may also be a parse tree. A concrete syntax tree represents the syntactic structure of a program in a hierarchical or tree structure. The concrete syntax tree is an n-ary tree data structure that includes nodes that represent a construct in the grammar of the programming language of a program. The concrete syntax tree includes one root node, multiple internal nodes, and multiple terminal nodes. The terminal nodes represent the tokens. A token is a symbol that represents an operand or an operator. The concrete syntax tree differs from an abstract syntax tree where the terminal nodes represent operands.

The pre-training component 202 extracts tokens from the concrete syntax trees to generate an ordered sequence of tokens (blocks 504, 508). The frequently-used elements in a programming language are encoded into tokens and the less frequently-occurring elements are encoded into combinations of characters referred to as subtokens. For simplicity, the term token shall include tokens and subtokens and the terms are used interchangeably.

In one aspect, the pre-training component 202 uses a byte-level byte-pair extraction algorithm to generate T-ordered sequences of subtokens, where T is the maximum context length. Byte-level byte-pair encoding (BBPE) is used to generate the vocabulary used by the neural transformer model. A text string, either a sequence of source code or a natural language text, is represented as a sequence of Unicode Transform Format, UTF-8 bytes. The input text string of subtokens is encoded as a sequence of UTF-8 bytes, where a subtoken is encoded into one to four bytes. A byte sequence is then partitioned into byte-level subwords, referred to as byte n-grams. (Collectively, blocks 504, 510).

The byte-level subwords are generated using the Byte Pair Encoding (BPE) algorithm, which extracts the k most frequently-occurring n-grams. The result is a vocabulary size of the k most frequently-occurring n-grams. An n-gram is a contiguous sequence of n subtokens from an input text string of either source code or natural language text. This type of encoding does not rely on knowing the underlying language making it suitable for an input sequence of text strings that contain source code or natural language text. The ordered sequences of UTF-8 bytes are translated into a T-ordered sequence of subtokens which are vector representations of a source code fragment or natural language text. The T-ordered sequence of subtokens is represented in a context vector. (Collectively, blocks 504, 512).

A denoising function, such as a span masking function, is then applied to each sequence that masks out a subset of subtokens and the masked span of subtokens is replaced with a mask subtoken, M. In one aspect, the first 80 percent of the subtokens of each sequence remains intact and the last 20 percent of the subtokens in the sequence are masked out. (Collectively, blocks 504, 514).

The model is trained with the masked sequences to learn to reconstruct the original sequence without the masked subtokens. The masked denoising is based on the doze task of evaluating human language-learners' proficiency, in which humans are given a foreign language with missing words, and are asked to correctly choose the missing word. The benefit of span-masking denoising in pre-training is that the model learns the desired programming language in an unsupervised fashion, but also is bi-directional in the sense that it learns the relationships of words both before and after their occurrence. (Collectively, blocks 504, 514).

Figure 6:
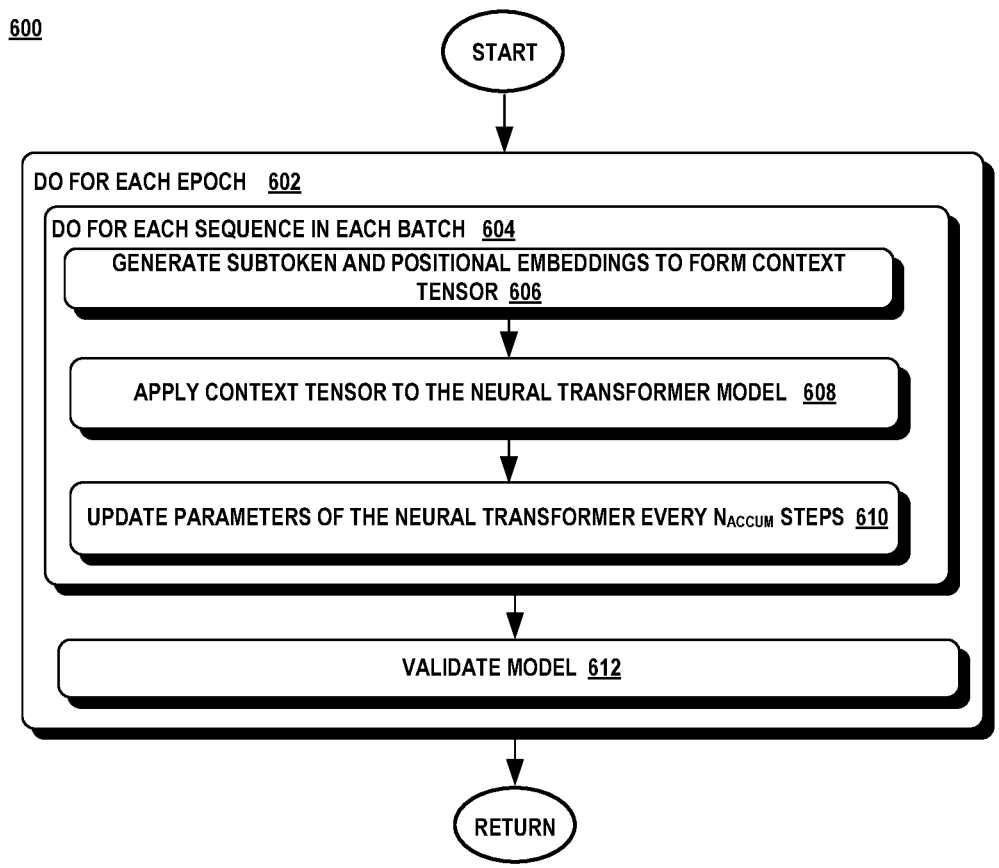
FIG. 6 is a flow chart illustrating application of the training sequences to the neural transformer model.

The pre-training component 202 then applies the pre-training dataset to the pre-trained configured neural transformer model (block 516). Turing to FIG. 6, there is shown an exemplary process 600 for applying the pre-training dataset to the pre-trained neural transformer. Neural transformer models are trained iteratively, making multiple passes over the training dataset before converging to a minimum. An epoch represents the entire training dataset passed forwards and backwards through the neural transformer block once. Since the training dataset is very large, it is partitioned into smaller batches. The training is iterative and the entire dataset is passed through the neural transformer in multiple iterations. Each training iteration includes forward propagation, loss calculation, backpropagation steps followed by updating the weights. The training dataset is partitioned into batches with each batch of sequences running through the training process.

The neural transformer model has multiple blocks and layers so that more detailed relationships within the data are learned as well as how the features interact with each other on a non-linear level. The model architecture, training procedure, data normalization and vocabulary encoding procedures are hyperparameters that are tailored to meet a particular objective. The values of the hyperparameters influence how the parameters are learned.

In one aspect, the hyperparameters may include the following: (1) subtoken and position embedding layer dimensions: e.g. 30000×768, and 1024×768 respectively; (2) the configuration of the neural transformer model with the number of encoder and decoder blocks, e.g. six for each; (3) for the training procedure: denoising auto-encoder, with a cross-entropy loss optimization objective; the sequence length of 1024 symbols; a mini-batch size of 8; the gradient accumulation steps for each weight update is 8; the Adam stochastic optimization procedure is used to train the feed forward neural network; and the learning rate is 0.0001; (4) the data normalization procedure: normalize all string and numerical literals, keeping the ten most frequent; and (5) the vocabulary encoding procedure: the number of tokens admitted by byte-level byte-pair encoding, preserve some number, e.g. ten, of the most frequent string and numerical literals encoding them as a single token during byte-level byte-pair encoding procedure.

For each sequence of each batch in each epoch (blocks 602, 604), the T-ordered sequences of subtokens are then mapped into numeric vectors and then into respective subtoken embeddings and positional embeddings. An embedding is a learned representation for the text-based subtokens where subtokens that have a common meaning have a common representation. An embedding is a mapping of discrete categorical variables to a vector of continuous numbers. There is an embedding for each subtoken in the vocabulary of a particular programming language and a corresponding positional embedding. The subtoken embedding represents the learned representation for the subtoken. The neural transformer model does not read each subtoken sequentially and as such, has no knowledge of the subtoken's position in a sequence without additional position information. The positional embedding is used to encode position information about a subtoken's position in a sequence into the neural transformer model. (Collectively, block 606).

Initial values are generated for the subtoken embedding and positional embeddings of each sequence which are then used to form a context tensor. Thereafter, the neural transformer model learns the values for each embedding. Upon the completion of the training phase, the embeddings for each subtoken and the positional embeddings are saved into respective matrices for later use. There is a subtoken embedding matrix, We, that contains an embedding vector for each subtoken $t_i$, i=0 ... V of a particular programming language, and a positional embedding matrix, Wp, that contains an embedding vector $P_j$, j=0 ... T, for each position, where V is the size of the vocabulary for a particular programming language and T is the length of the subtoken sequence. (Collectively, block 606).

The first encoder block 402 of the pre-trained neural transformer model 400 takes the context tensor 409 as input and passes it through the multiple layers of multi-head attention, layer normalization and feed-forward neural network to finally produce a set of hidden representations If there are additional encoder blocks, the output of each encoder block is passed onto the next encoder block with the output of the last encoder block producing the set of hidden representations 421. The set of hidden representations is passed onto each decoder block 404 and the masked prediction head 422. (Collectively, block 608).

The masked prediction head 422 generates output probabilities of each token in the model vocabulary which is used to predict the tokens to replace the masked tokens (block 608).

The decoder blocks 404 of the pre-trained neural transformer model 400 takes a shifted sequence of an output embedding as input. The masking in the masked multi-head attention layer is used to prevent positions from attending to subsequent positions in the future. The masking combined with the output embeddings shifted by one position ensures that the predictions to position T depend only on the known outputs at positions less than T. Starting with the first token of the output sequence, the subtokens are passed through the self-attention and normalization layers and into the encoder-decoder attention layer, serving as the query for encoder-decoder attention, where the key and value pairs for the attention are the outputs of encoder. The encoder output was calculated with the entire input embedding sequence. (Collectively, block 608).

The feed forward neural networks in the encoder blocks 202 and the decoder blocks 204 are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 608).

At the completion of each batch, the parameters of the neural transformer model are updated at a preconfigured frequency denoted as Naccum. Naccum is a gradient accumulation frequency and in one aspect has a value of 8. The parameters include the subtoken embeddings and the positional embeddings which are stored in a respective embedding matrix. (Collectively, block 610).

Next, the neural transformer model is validated. Before the neural transformer model is trained, a set of hyperparameters is selected randomly and then tuned to achieve a desired performance. The neural transformer model is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 612).

Attention now turns to a discussion of the architecture of the neural transformer for fine-tuning.

Configuration of the Neural Encoder Transformer Model for Fine-Tuning

Figure 7:
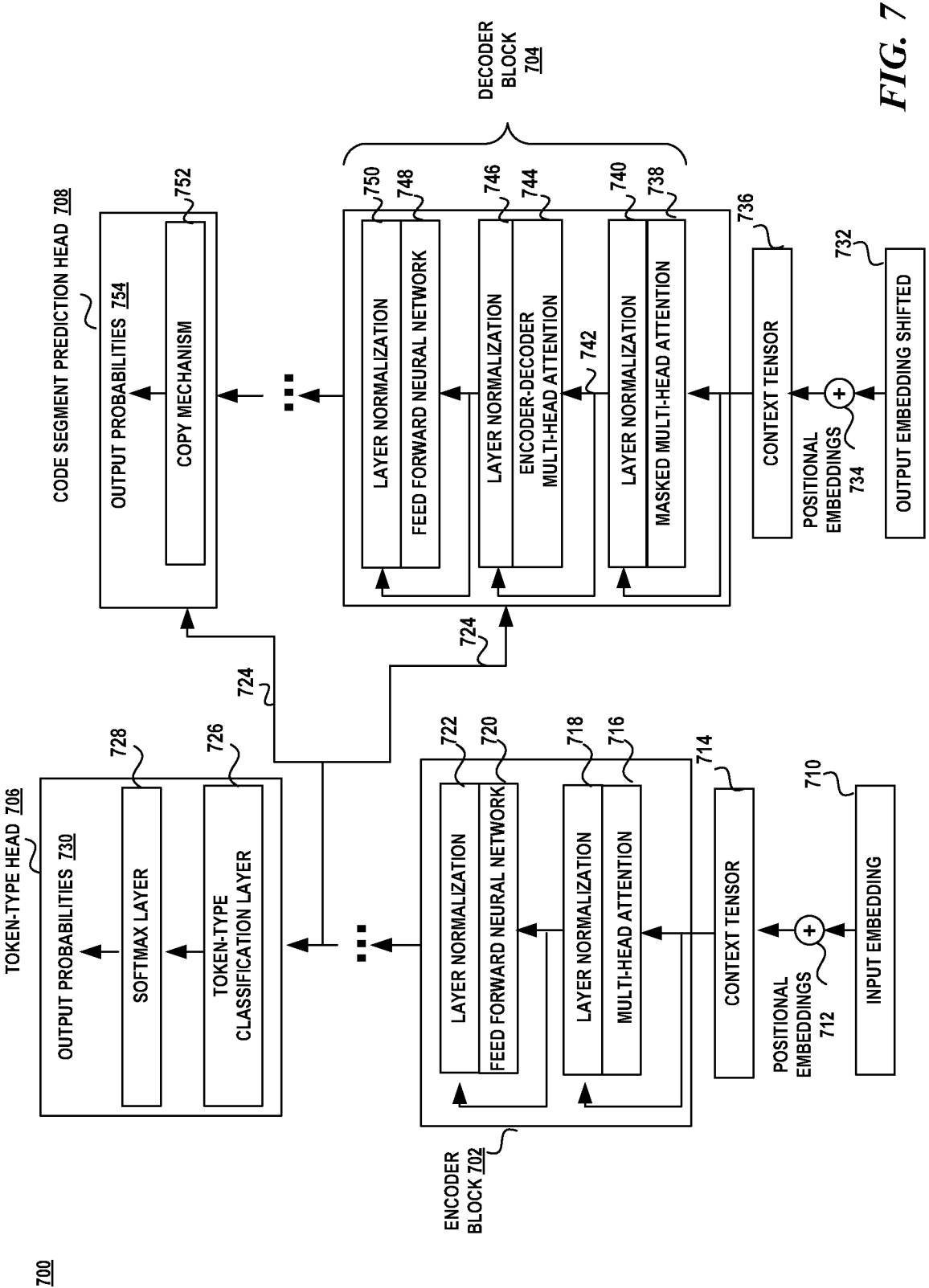
FIG. 7 is a schematic diagram illustrating an exemplary configuration of the fine-tuning architecture of the neural transformer model.

Turning to FIG. 7, there is shown an exemplary diagram of the neural transformer model for fine-tuning 700. The configuration of the neural transformer model for fine-tuning is similar to the pre-training configuration except for the head layers of the encoder and decoder. The last encoder block is coupled to a token-type head layer 706 and the last decoder block is coupled to a copy segment prediction head 708 having a copy mechanism or pointer network.

The configuration of the neural transformer model for fine-tuning includes one or more encoder blocks 702 coupled to one or more decoder blocks 704. The encoder block 702 consists of two layers. The first layer includes a multi-head self-attention component 716 followed by layer normalization component 718. The second layer includes a feed-forward neural network 720 followed by a layer normalization component 722. The multi-head self-attention layer 716 receives a context tensor 714 composed of an input embedding 710 combined with a corresponding positional embedding 712. The context tensor 402 is input to the layer normalization 718. The output of the layer normalization 718 is input to the feed forward neural network 720 with another residual connection to layer normalization 722. The output of each encoder block is a set of hidden representations 724. The set of hidden representations 724 are then sent through additional encoder blocks, if multiple encoder blocks exist. The output of the top encoder block 702 is sent to the token-type head 706 and to each decoder block 704.

The token-type head layer 706 includes a token-type classification layer 726 and a softmax layer 728. The token-type classification layer 726 is a fully-connected neural network that projects the raw scores output by the last encoder block into a logits vector. The softmax layer 728 applies the softmax function to the logits vector to compute a vector that represents the probability distribution 730 of the token types of each token in the input embedding 710.

The decoder block 704 consists of three layers. The first layer includes a masked multi-head attention component 738 followed by a layer normalization component 740. The output of the layer normalization component 740 is input into the encoder-decoder multi-head attention component 744 with a residual connection to layer normalization component 746. The third layer includes a feed forward neural network 748 followed by a layer normalization component 750. The output of layer normalization component 746 is input into the feed forward neural network 748 with a residual connection to layer normalization component 750.

The output from the top decoder block is input to a code segment prediction head 708 that includes a copy mechanism or pointer network 752. A translation task may require the model to generate tokens in a translation that appear in the input sequence but are out-of-the-vocabulary of the model. To account for this situation, the copy mechanism chooses between generating a token from the target vocabulary or copying a token from the input sequence via pointing. The copy mechanism selects the appropriate token based on a probability over each token in the target vocabulary and a probability over each token in the input sequence at every decoding step.

In one aspect, the copy mechanism is a pointer-generator network which is a head layer leveraging both encoder and decoder information to allow the model to learn to predict tokens from the vocabulary and predict copying tokens from the input sequence. For each decoding step t, mixture weights λ for the probability of generating tokens from the vocabulary and copying tokens from the context are calculated. The two distributions are summed in a weighted manner to obtain the final distribution.

The encoder receives an input embedding of a sequence of tokens, $(x_0, x_1, \ldots, x_T)$ and produces a sequence of encoder hidden states $(h_0, h_1, \ldots, h_T)$. The decoder, at each time step t, receives the previously-generated token of the decoder, at time step t−1, and generates a decoder state $s_t$. The sum of the encoder hidden states is weighted by an attention distribution, $\alpha_t$, which is generated and referred to as a context vector $z_t$. The context vector is represented mathematically as follows: $z_t = \Sigma_{i=1}^m \alpha_{ti} h_i$, where $\alpha_t$=softmax $(e_t)$, $e_{ti} = v^T \tanh(W_h h_t + W_s s_t\, b_{attn})$, $h_i$ is the representation of i-th token from the encoder, $s_t$ denotes the output Representation of t-Th Token from the Decoder, and $b_{attn}$ is the Attention Bias, where v, $W_h$, $W_s$, $b_{attn}$ are tunable parameters.

The probability of choosing generation instead of copying, $\lambda$, indicates whether to select a token from the model vocabulary by sampling from the model vocabulary distribution, $P_{vocab}$, defined as $P_{vocab}(y_t) = \text{softmax}(W^e(W^v s_t + b^v))$ where $s_t$ denotes the output representation of $t^{th}$ token from the decoder, $y_t$ is the probability distribution of $t^{th}$ word token, the output embedding $W^e$ is tied with the corresponding part of the input embedding, and $W^v$ and by are learnable parameters from the copy distribution $P_{copy}$, over the vocabulary, defined as $P_{copy}(y_t) = \Sigma_{i:x_i=y_t} \alpha_{ti}$. The generation probability is represented mathematically as $\lambda \in [0, 1]$, and is calculated at each decoder time step, t.

The final probability of generating token $y_t$ at position t is defined as a mixture of the vocabulary distribution $P(y_t) = \lambda P_{vocab}(y_t) + (1-\lambda) P_{copy}(y_t)$, where $\lambda = \text{sigmoid}(w^z z_t + w^s s_t + b^m)$, where $w^z$, $w^s$ and $b^m$ are learnable parameters. If a token, $y_t$, is an out-of-vocabulary token, then $P_{vocab}(y_t)=0$ and if $y_t$ does not appear in the input sequence then $P_{copy}(y_t)=0$.

Attention now turns to a description of fine-tuning the model on supervised translation tasks.

Fine-Tuning on Supervised Translation Tasks

Figure 8:
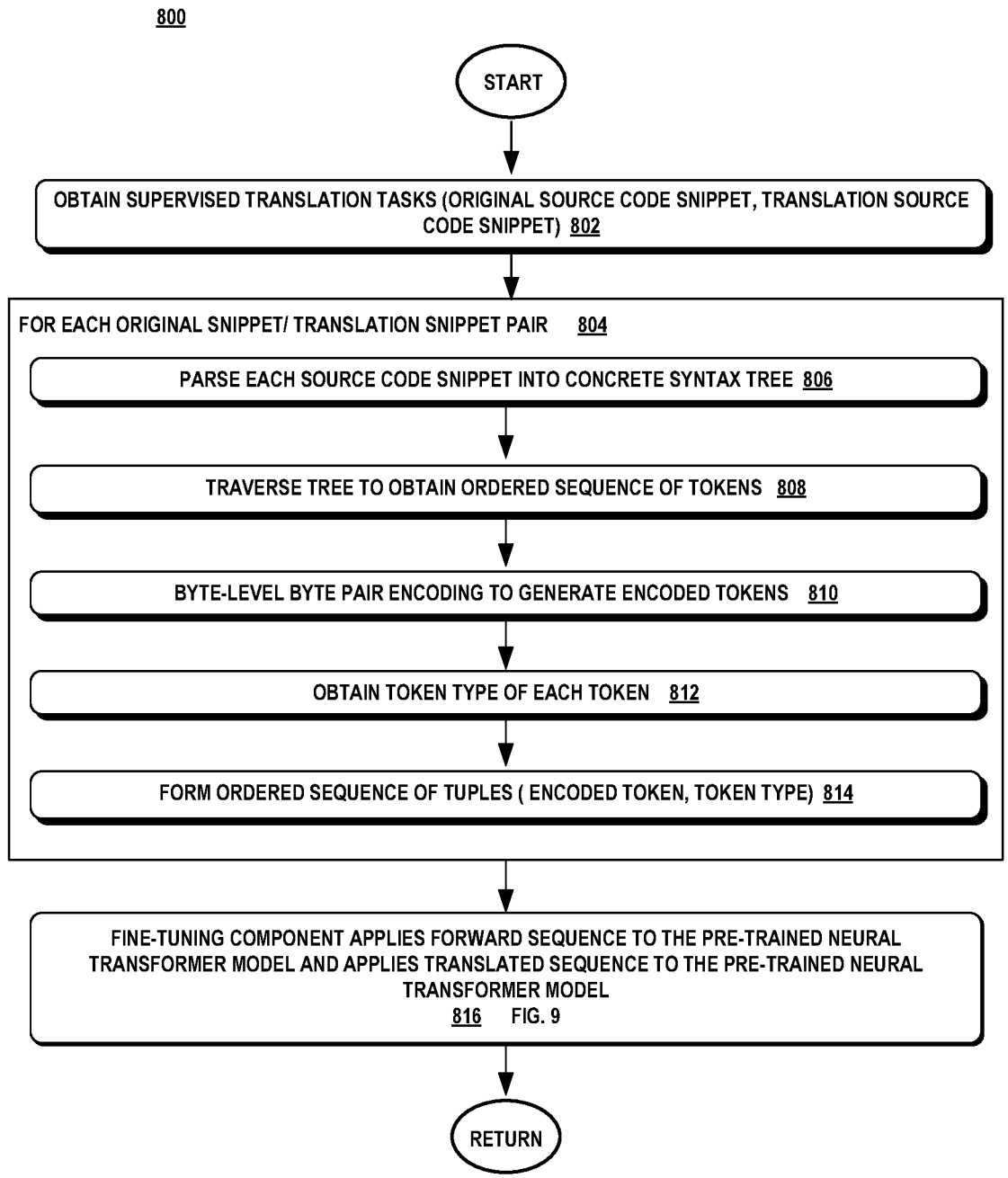
FIG. 8 is a flow chart illustrating a method for fine-tuning the neural transformer model with supervised translation tasks.

Turning to FIG. 8, there is shown an exemplary method 800 for fine-tuning the pre-trained model on supervised translation tasks. The fine-tuning component 208 obtains a supervised set of translation tasks (block 802). A supervised translation task includes a pair of source code snippets having an original source code snippet written in a first programming language and a known translation in a second programming language. For each pair (block 804), the original source code snippet and the translated source code snippet are parsed into a concrete syntax tree (block 806). The tree is traversed to obtain an ordered sequence of tokens (block 808), byte-pair encoding is used to generate an encoding for each token (block 810). The token type for each token is determined (block 812) and a tuple is formed for each token including the encoded token, and its token type, <encoded token, token type> (block 814).

Each sequence is represented as an ordered sequence of token tuples, where each token tuple includes a token and its corresponding token type. A token type consists of identifiers, literals, and reserved keywords. The identifiers include "type", "method", and "variable", literals include "int", "float", "char", and "string", and reserved keywords include "public", "private", and "void".

The fine-tuning component 208 applies the ordered sequence of token tuples representing the original source code snippet to the pre-trained neural transformer model and the ordered sequence of token tuples representing the corresponding translation to the pre-trained neural transformer model (block 816).

Figure 9:
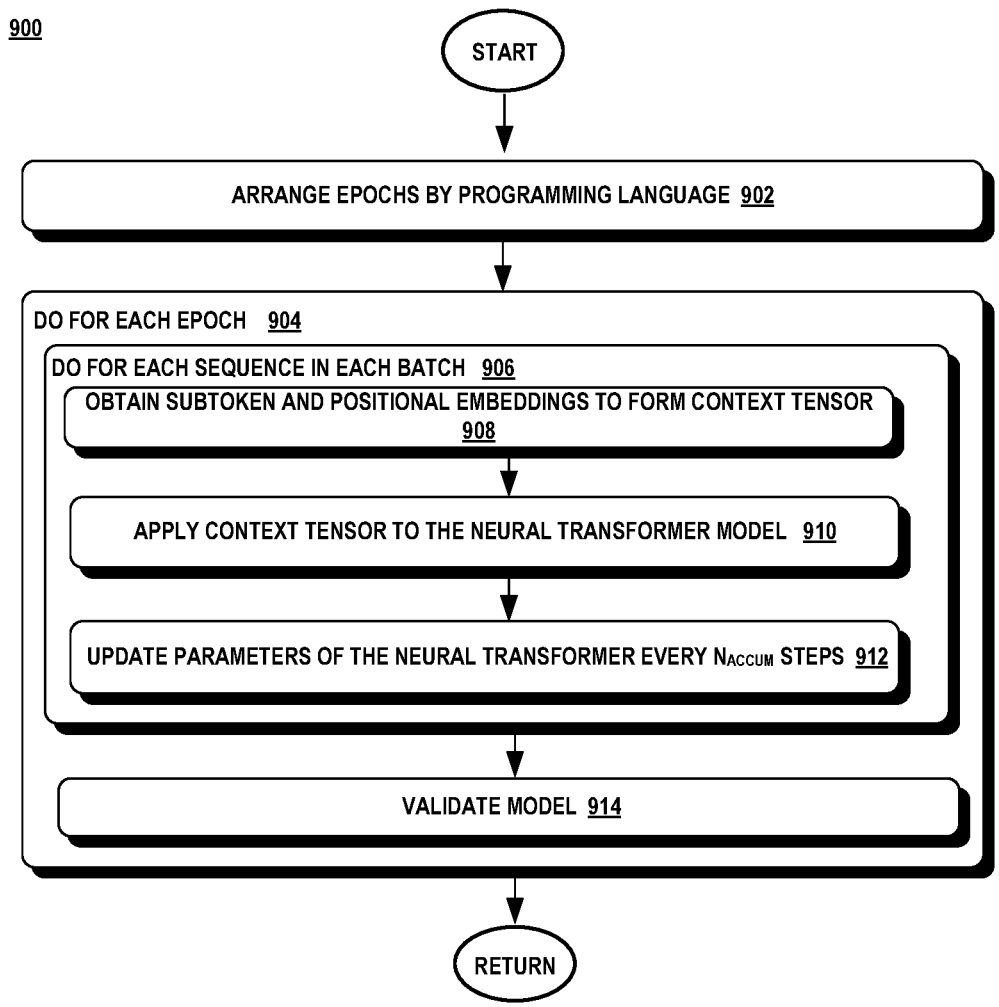
FIG. 9 is a flow chart illustrating a method for applying the supervised translation tasks to the model.

Turning to FIG. 9, there is shown an exemplary method 900 for fine-tuning the pre-trained models. The fine-tuning component 208 arranges each epoch by a specific programming language so that each epoch contains ordered sequence of token tuples that pertain to the same programming language (block 902).

For each sequence of each batch in each epoch (blocks 904, 906), the ordered sequences of tuples are mapped into numeric vectors, where the token vectors are fed into the encoder block and the token types are used in the token type prediction head (block 908).

The first encoder block 702 of the pre-trained neural transformer model takes the context tensor 714 as input and passes it through the multiple layers of multi-head attention, layer normalization and feed-forward neural network to finally produce a set of hidden representations If there are additional encoder blocks, the output of each encoder block is passed onto the next encoder block with the output of the last encoder block producing the set of hidden representations 724. The set of hidden representations 724 is passed onto each decoder block 704, the token-type classifier 726, and the copy mechanism 752. (Collectively, block 910).

The token-type classifier 726 generates output probabilities for each token type of each token. The cross-entropy is computed for the output probability distribution with the empirical token type values known at training time, adding this quantity to the total training loss. (Collectively, block 910).

At each time step, the copy mechanism 752 receives the output of the last decoder block 704, the hidden states of the encoder, and generates a generation probability that selects the next token that the decoder outputs (block 910).

At the completion of each batch, the parameters of the neural transformer model are updated at a preconfigured frequency denoted as $N_{accum}$. The parameters include the subtoken embeddings, positional embeddings, the self-attention and normalized feed forward layers in each encoder and decoder block, the linear layers in the prediction heads, and the linear layers in the copy mechanism, all stored in their respective matrices. (Collectively, block 912).

Next, the neural transformer model is validated, by evaluating translations on known pairs of source code snippets, judging the syntax correctness, computing Bilingual Evaluation Understudy (BLEU) and/or Recall-Oriented Understudy for Gisting Evaluation (ROUGE) metric similarities, and the ability of the translated codes to pass unit tests ensuring their correctness. (Collectively, block 914).

Fine-Tuning on Data-Augmented Translation Tasks

Figure 10:
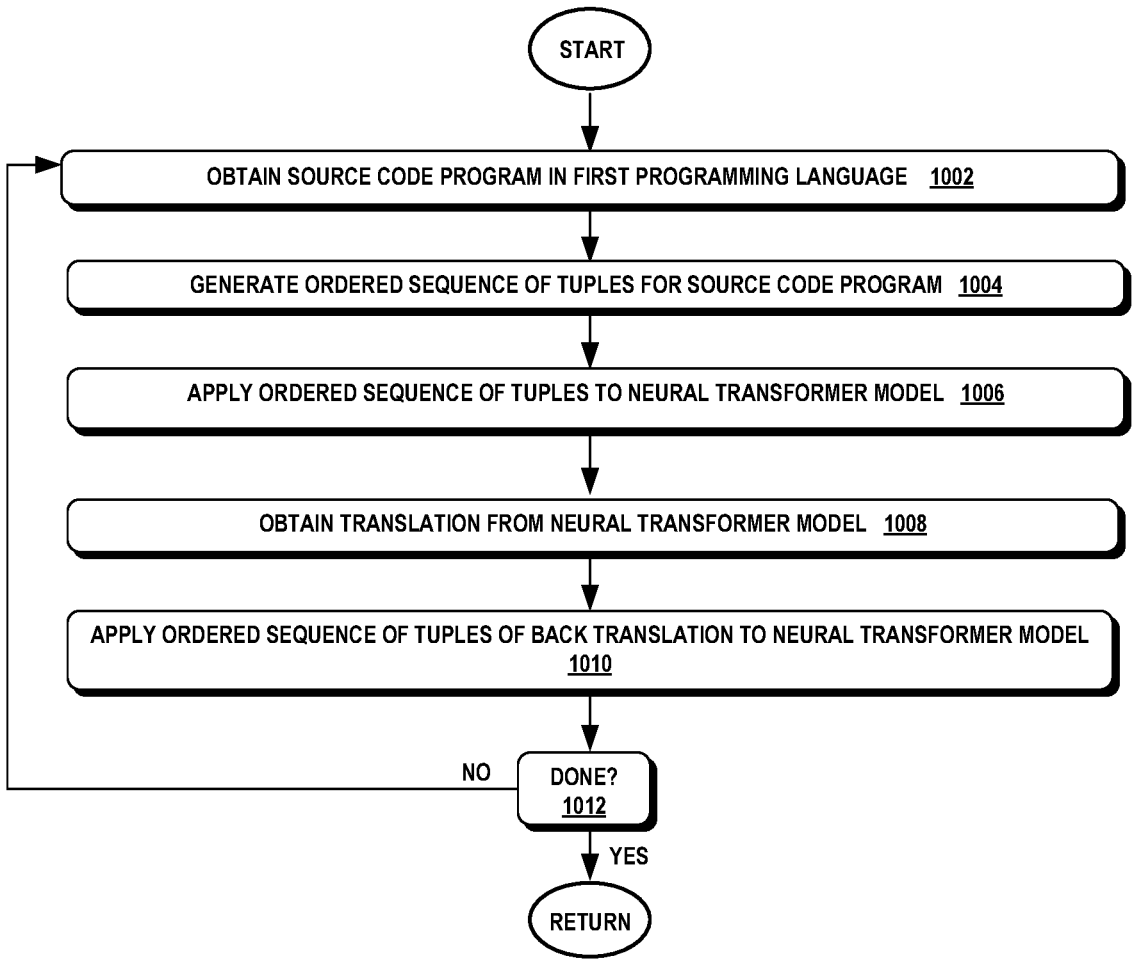
FIG. 10 is a flow chart illustrating a method for fine-tuning the neural transformer model with data-augmented translation tasks.

Turning to FIG. 10, there is shown an exemplary method 1000 for fine-tuning the pre-trained model on data-augmented translation tasks. A data-augmented translation task trains the model on a source code snippet written in a first programming language not having a known translation in a second programming language. The second programming language differs from the first programming language. Instead, the translation generated by the neural transformer model or back translation is used as the data-augmented translation. The data-augmented task includes the original source code snippet and a model-generated back translation.

A large corpus of source code programs written in one or more different programming languages is retrieved (block 1002). Each source code program is transformed into an ordered sequence of tuples as described above with respect to FIG. 8 (block 1004). Each ordered sequence of tuples is applied to the trained neural transformer model (block 1006) to output a translated sequence of tokens representing a translation into the second programming language (block 1008). A control token in input into the decoder to identify the second programming language. The application of the ordered sequence of tuples is performed as discussed above with respect to FIG. 9.

The translated sequence of tokens is referred to as the back translation since it is generated from the neural transformer model (block 1010). The application of the back-translated sequence to the neural transformer model should produce the original sequence of tuples. Blocks 1002-1010 are repeated (block 1012-no) until there are no more sequences in the training dataset (block 1012-yes).

Source Code Translation Using Neural Transformers

Figure 11:
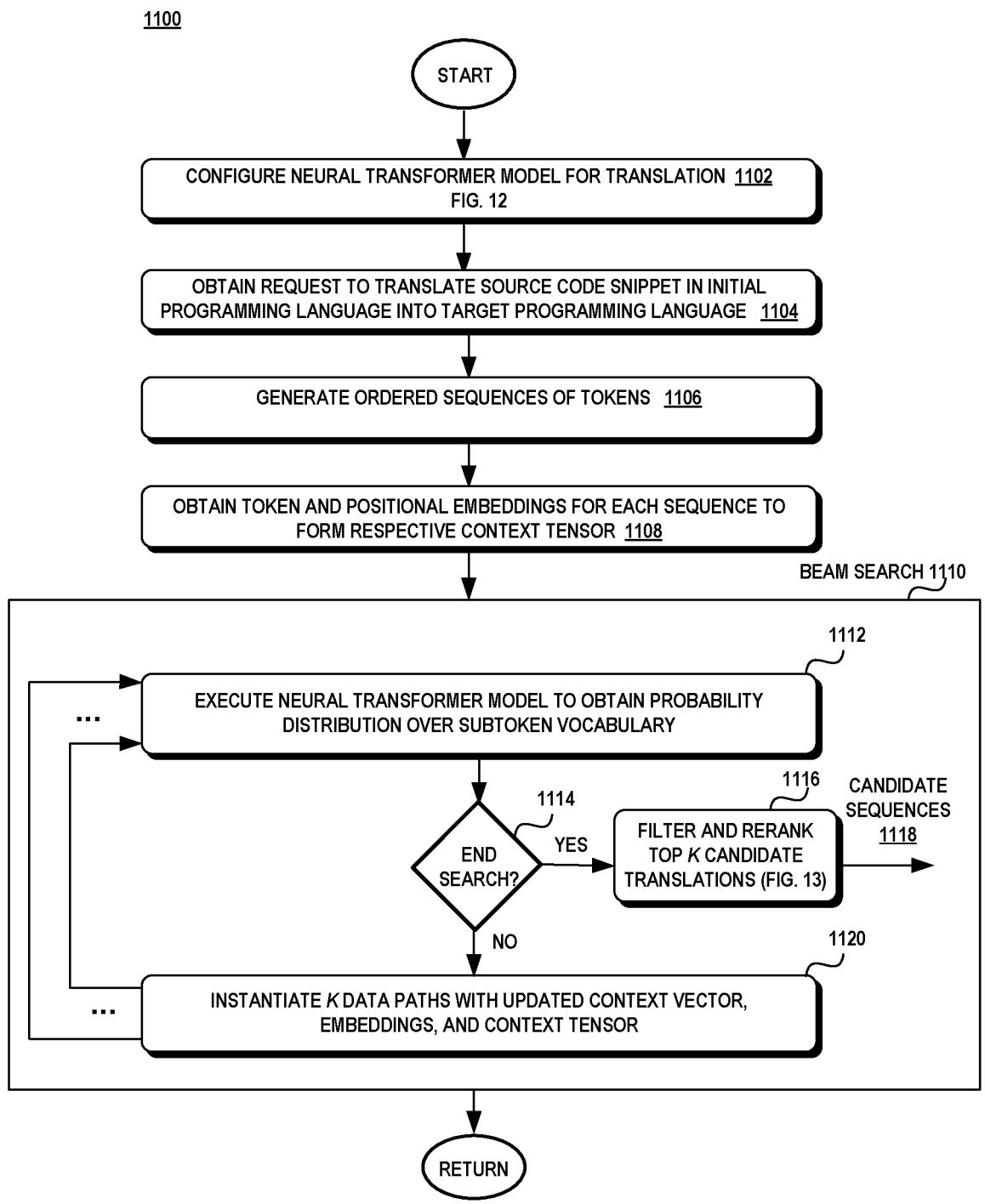
FIG. 11 is a flow chart illustrating a method for translating a source code snippet from one programing language into another programming language.

Turning to FIG. 11, there is shown an exemplary method 1100 for translating a source code program from one programming language into a different programming language. Initially, the neural transformer model is configured to perform the translation (block 1102).

Figure 12:
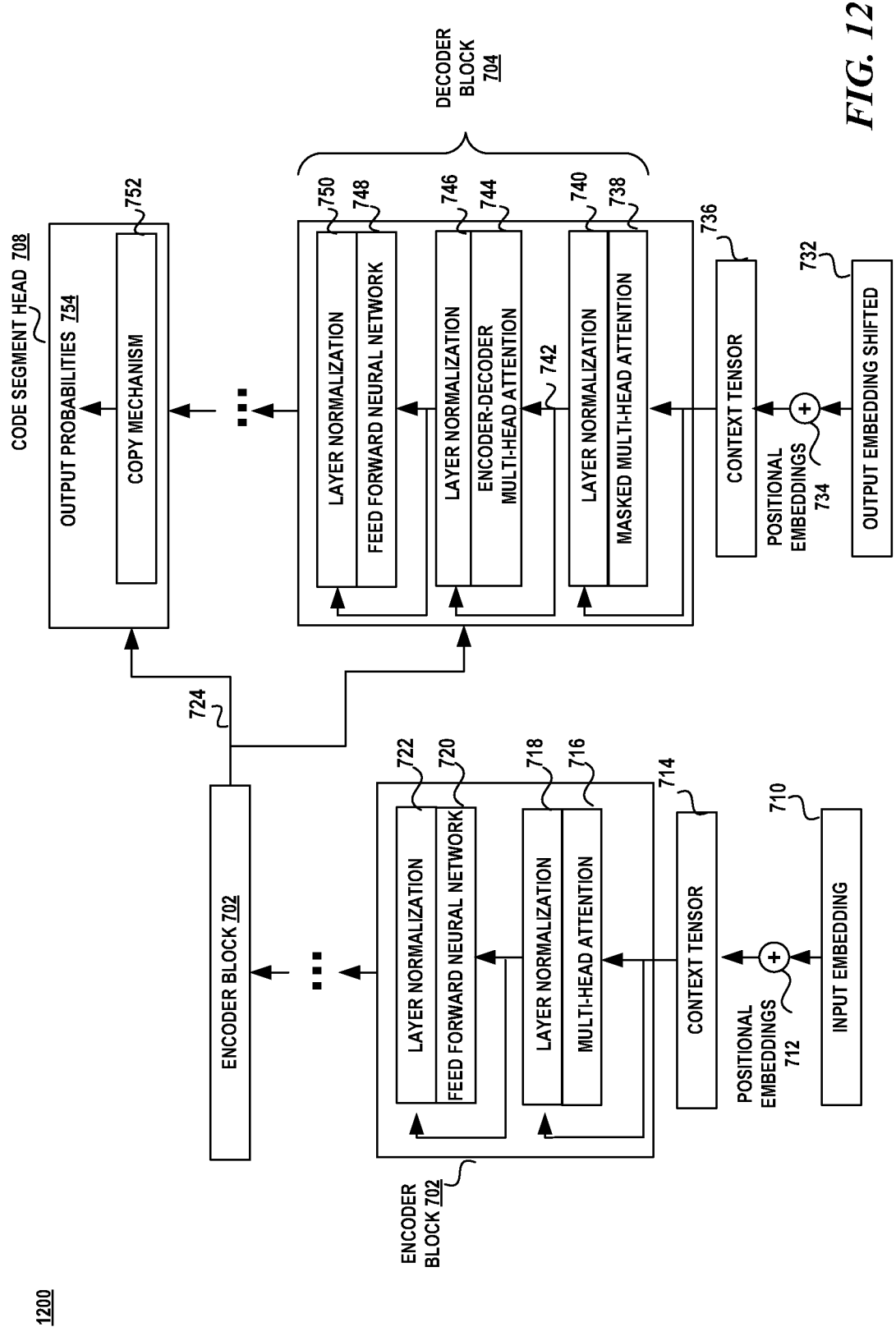
FIG. 12 is a schematic diagram illustrating an exemplary configuration of the neural transformer model for translation.

Turning to FIG. 12, there is shown an exemplary configuration of the neural transformer model for translation. The configuration is the fine-tuning configuration shown in FIG. 7 without the token-type head of the last encoder block.

The neural transformer model 1200 includes one or more encoder blocks 702 and one or more decoder blocks 704. An encoder block 702 consists of two layers. The first layer includes a multi-head self-attention component 716 followed by layer normalization component 718. The second layer includes a feed-forward neural network 720 followed by a layer normalization component 722. The multi-head self-attention layer 716 receives a context tensor 714 composed of an input embedding 710 combined with a corresponding positional embedding 712. The context tensor 714 is input to the layer normalization 718. The output of the layer normalization 718 is input to the feed forward neural network 720 with another residual connection to layer normalization 722. The output of each encoder block is a set of hidden representations 724. The set of hidden representations 724 are then sent through additional encoder blocks, if multiple encoder blocks exist. The output of the top encoder block 702 is sent to each decoder block 704.

The decoder block 704 consists of three layers. The first layer includes a masked multi-head attention component 738 followed by a layer normalization component 740. The output of the layer normalization component 740 is input into the encoder-decoder multi-head attention component 744 with a residual connection to layer normalization component 746. The third layer includes a feed forward neural network 748 followed by a layer normalization component 750. The output of layer normalization component 746 is input into the feed forward neural network 748 with a residual connection to layer normalization component 750.

The output from the top decoder block is input to a code segment prediction head 708 that includes a copy mechanism or pointer network 752. The copy mechanism selects the appropriate token based on a probability over each token in the target vocabulary and a probability over each token in the input sequence at every decoding step.

Turning back to FIG. 11, the translation engine 104 receives a request to translate a source code snippet (block 1104). The source code snippet may be a method, class, program or file (block 1104). The translation engine 104 parses the source code snippet into a concrete syntax tree and extracts tokens from the concrete syntax tree into ordered sequences of subtokens, each of length T (block 1106). Subtoken embeddings are obtained for each subtoken of an ordered sequence and the corresponding position embeddings (block 1108). The embeddings were learned for each token during the training of the model and are shared between all languages.

The translation engine 104 performs a beam search 1110 to generate k translation candidate sequences (block 1110). A translation candidate sequence is a translation generated by the neural transformer model. The decoder's computation at training time may be parallelized using masked self-attention but during translation, the subtokens are generated one token at a time. The neural transformer model factorizes the probability of the target subtokens in an input sequence into a product of conditional probabilities for each subtoken using the formula: $p(t_1, t_m|s) = \Pi_{i=1}^{m} p(t_i|t_1, \ldots, t_{i-1}, s)$. During translation, the calculation of the product of the conditional probabilities for each subtoken is complex and extremely time consuming making the model difficult for real-time applications. Beam search is an approximation algorithm that performs faster.

The beam search uses the probability distribution generated by the neural transformer model to identify the top k subtokens likely to be the next subtoken in a translation candidate sequence. The beam search expands the search by instantiating new partial sequences using each of the selected subtokens identified by the neural transformer model's probability distribution. The search continues generating new partial sequences from the top k subtokens identified by the output distributions until the search ends. The search may end when the end-of-method token appears as the most probable next subtoken or the maximum length threshold is exceeded. (Collectively, block 1110).

A beam search uses a breadth-first search to build a search tree. The search tree is composed of nodes at one or more inference levels. Each node represents a probability distribution generated by the neural transformer model for the subtokens in the model vocabulary. At each level, only the top k subtokens having the highest probabilities from the output distribution generated by the neural transformer model are expanded to the next inference level. The variable k is preconfigured and referred to as the beam width. Each of the k subtokens is then expanded into a search that updates the current translation candidate sequence with the selected subtoken to input into the neural transformer model to generate an additional probability distribution for the next subtoken in a sequence. This process is repeated until the toss end-of-method token appears as the most probable next subtoken or the maximum length threshold is exceeded. (Collectively, block 1110)

The beam search 1110 uses the neural transformer model with the context tensor to generate a probability distribution for the subtoken vocabulary at each decoder time step (block 1112). If the probability distribution indicates that the next likely token is the end-of-method token or the maximum sequence length threshold has been exceeded, then the beam search is finished (block 1114-yes). The translation candidate sequences are then filtered and ranked (block 1116) to produce those translations deemed more accurate (block 1118). Otherwise (block 1114-no), the top k subtokens to complete a partial sequence are selected (block 1120).

Each of the selected subtokens is then input in a respective context vector and has a separate data path through the neural transformer model again. The context vector utilizes the selected subtoken in the current context vector with the last subtoken removed. The new context vector will consist of T subtokens with the selected subtoken $t_k$ added to the beginning of the sequence with the last subtoken removed from the sequence. If the current context vector consists of a subtoken sequence consisting of $t_0, t_1, \ldots, t_T$, then the new context vector will consist of $t_k, t_0, t_1, \ldots, t_{T-1}$. (Collectively, block 1120).

Attention now turns to a discussion on the selection and ranking of the best translation candidate sequences.

Filtering and Ranking of Translation Candidate Sequences

The training of the neural transformer model is based on a gradient descent technique that aims at minimizing a cross-entropy loss function. The cross-entropy loss function is used to update the parameters of the model, such as the weights. The cross-entropy loss indicates how well the model is at making predictions given a set of parameters. The model is trained to minimize the cross-entropy loss function based on the assumption that it will result in a lower error between the predicted values and the output values.

The cross-entropy loss function is not always useful for predicting a model's performance with real translation tasks. A predicted translation may be syntactically-incorrect, semantically dissimilar, or may be unnatural code style for the target language. The BLEU metric and syntax correctness, such as judging whether concrete syntax trees can be formed without error, are used to measure the similarity between a predicted translation and a true translation. However, these metrics are not differentiable with respect to the model parameters and thus cannot be optimized during the training process. To overcome these deficiencies, the ranking engine 110 filters out those translation candidate sequences that do not meet a certain criterion and computes a ranking score for each of the unfiltered translation candidate sequences.

The ranking score is based on four factors to determine how the translation candidate sequences are ranked before being output. The four factors include: a forward probability, $p(Y|X)$; a backward probability $p(X|Y)$; an unconditioned source code language model probability, $p(Y)$, trained on monolingual data; and a bilingual syntactic symmetry based on the cosine similarity between a code embedding for the input source code program and a code embedding for the translation.

The ranking score is represented mathematically as follows:

$$\text{Score}(Y,X) = P(Y|X) + \lambda \cdot P(X|Y) + \gamma \cdot P(Y) + \beta \cdot \cos(\text{Code2Vec}(X), \text{Code2Vec}(Y)), \text{ where } \lambda, \gamma, \text{ and } \beta \text{ are weights.} \quad (1)$$

The first term in the ranking score $\lambda \cdot P(Y|X)$, is the forward probability, which is the output probability from the neural transformer model, as it is the criterion for ranking hypotheses in beam search.

The second term $\lambda \cdot P(X|Y)$ is the backward probability, which is obtained using the neural transformer model by inputting the predicted translation Y, and scoring the model's log probabilities of predicting the original input sequence X.

The third term $\gamma \cdot P(Y)$ is the probability of the predicted translation alone, not conditioned on the input. The source code language model 112 is used to generate this probability.

The fourth term in the ranking score uses a separately-trained Code2Vec model 114, which judges the syntactic similarity of the input sequence and the translation candidate sequence. The Code2Vec model 114 embeds the input sequence and translation candidate sequence into a new hidden vector space determined by the Code2Vec model 114 and computing the cosine similarity of the two vectors.

Figure 13:
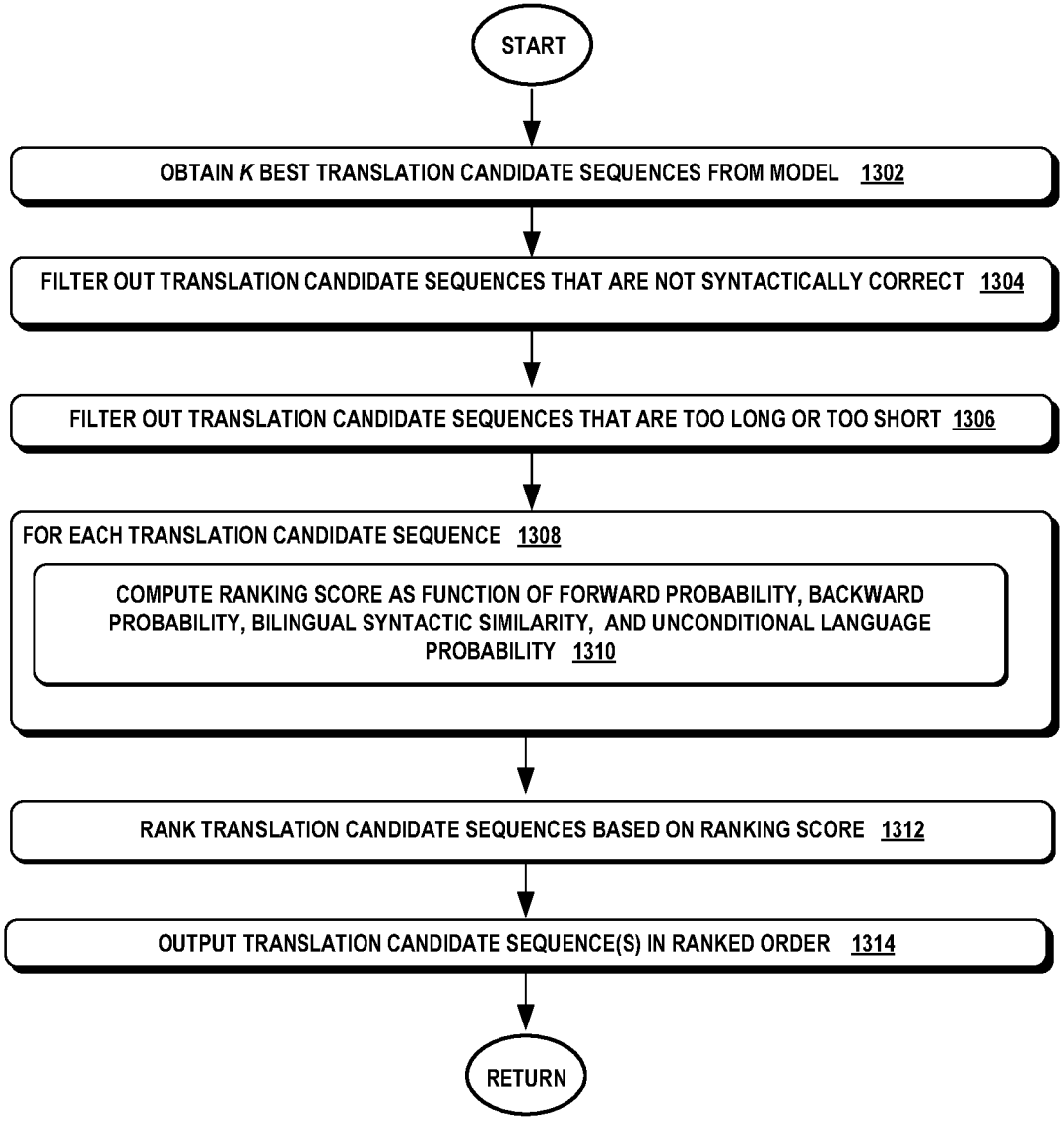
FIG. 13 is a flow chart illustrating a method for filtering and ranking the translation candidate sequences.

Turning to FIG. 13, there is shown an exemplary method 1300 for selecting and ranking the translation candidate sequences. The translation engine 104 receives the top k translation candidate sequences generated from the neural transformer model (block 1302). The translation candidate sequences which are not syntactically correct are filtered out of the set of k translation candidate sequences (block 1304). The translation engine 104 performs a compilation of each of the translation candidate sequences to determine whether or not a translation candidate sequence is syntactically correct (block 1304). The translation engine 104 also filters out those translation candidate sequences that are too short or too long (block 1306), to avoid cases where the decoding process gave up too early or used too many tokens, based on the assumption that the source and target programming languages should be representable with similar token lengths.

For each of the remaining translation candidate sequences (block 1308), the ranking score is computed using equation (1) above. The ranking score for a translation candidate sequence includes four factors, each of which may be computed in parallel with the other computations.

The forward probability is the log probability of the translation candidate sequence computed by the neural transformer model. The forward probability represents the probability of the translated candidate sequence Y conditioned on the input sequence X. The forward probability is represented mathematically as: $P(Y|X) = \Sigma_{(x,y)(X,Y)} \log \Pi_{t=1}^n P(y_t | y_{<t}, x; \theta)$, where $\theta$ represents the model parameters.

The backward probability is computed by using the neural transformer model with the translated candidate sequence to output an output sequence based on the translated candidate sequence. The backward probability is represented mathematically as: $P(X|Z) = \Sigma_{(x,z)(X,Z)} \log \Pi_{t=1}^n P(x_t | x_{<t}, z; \theta)$, where X represents the translated candidate sequence and Z represents the translated candidate sequence output based on the translated candidate sequence.

The unconditional language probability of the translated candidate sequence, $P(Y) = \Sigma_i P(Y_i | Y_{<i})$, where $Y_i$ is the $i^{th}$ token of the candidate sequence, and the unconditional language probability is computed by the source code language model 112.

The bilingual syntax similarity is used to judge the syntactic similarity between the input sequence and the translation candidate sequence. In one aspect, a Code2Vec model is used. The Code2Vec model is a neural network model that represents source code snippets as continuous distributed fixed-length vectors or embeddings. The difference between the two vectors or code embeddings indicates the syntactic similarity of the two code snippets. (Collectively, block 1310).

A code embedding for a translation candidate sequence is computed as well as a code embedding for the initial input sequence. The cosine similarity between the two code embeddings is computed and used in the ranking score for the translation candidate sequence. The cosine similarity is defined mathematically as follows:

$$\text{Similarity} = \cos(\theta) = \frac{A \cdot B}{\|A\| \|B\|} = \sum_{i=1}^{n} A_i B_i \bigg/ \left( \sqrt{\sum_{i=1}^{n} A_i^2} \sqrt{\sum_{i=1}^{n} B_i^2} \right),$$

where $A_i$ and $B_i$ are components of vectors A and B respectively. (Collectively, block 1310).

Once each of the four factors are computed, the ranking score is computed as an aggregation of each of the factors of a translation candidate sequence as noted above in equation (1) (block 1310). Once the ranking score is computed for each of the translation candidate sequences, the translation candidate sequences are ranked in decreasing order of the ranking score (block 1312) and output in the ranked order (block 1314).

Exemplary Operating Environment

Figure 14:
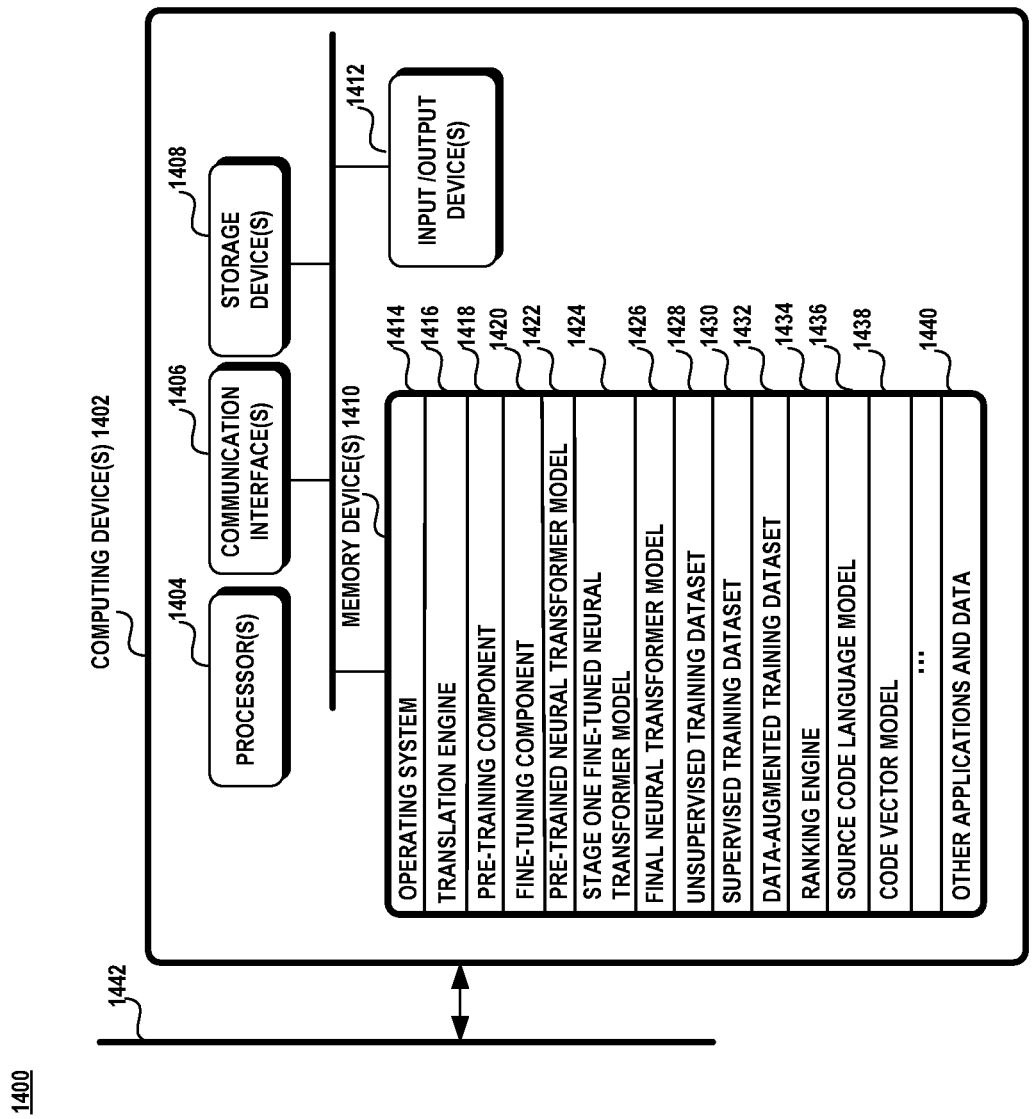
FIG. 14 is a block diagram illustrating an exemplary operating environment.

Attention now turns to a discussion of an exemplary operating environment. FIG. 14 illustrates an exemplary operating environment 1400 in which one or more computing devices 1402 are used to train and utilize the neural transformer models. However, it should be noted that the aspects disclosed herein is not constrained to any particular configuration of devices. Computing devices 1402 may be configured as a cloud service that generates the neural transformer model as a service for source code translation. It should be noted that the operating environment is not limited to any particular configuration and other configurations are possible.

A computing device 1402 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 1400 may be configured in a network environment, a distributed environment, a multi-processor environment, or a stand-alone computing device having access to remote or local storage devices.

The computing device 1402 may include one or more processors 1404, one or more communication interfaces 1406, one or more storage devices 1408, one or more input/output devices 1412, and one or more memory devices 1410. A processor 1404 may be any commercially available or customized processor and may include dual microprocessors and multi-processor architectures. A communication interface 1406 facilitates wired or wireless communications between the computing device 1402 and other devices. A storage device 1408 may be computer-readable medium that does not contain propagating signals, such as modulated data signals transmitted through a carrier wave. Examples of a storage device 1408 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 1408 in the computing device 1402. The input/output devices 1412 may include a keyboard, mouse, pen, voice input device, touch input device, display, speakers, printers, etc., and any combination thereof.

A memory device or memory 1410 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 1410 may also include one or more external storage devices or remotely located storage devices that do not pertain to propagated signals, such as modulated data signals transmitted through a carrier wave.

The memory device 1410 may contain instructions, components, and data. A component is a software program that performs a specific function and is otherwise known as a module, program, component, and/or application. The memory device 1410 may include an operating system 1414, a translation engine 1416, a pre-training component 1418, a fine-tuning component 1420, a pre-trained neural transformer model 1422, a stage-one fine-tuned neural transformer model 1424, a final neural transformer model 1426, an unsupervised training dataset 1428, a supervised training dataset 1430, a data-augmented training dataset 1432, a ranking engine 1434, a source code language model 1436, a code vector model 1438, and other applications and data 1440.

The computing devices 1402 may be communicatively coupled via a network 1442. The network 1442 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 1442 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

A system is disclosed having one or more processors and a memory that stores one or more programs that are configured to be executed by the one or more processors. The one or more programs including instructions to perform acts that: receive a source code snippet written in a first programming language; and translate the source code snippet into a second programming language using a neural transformer model with attention, wherein the neural transformer model with attention is jointly pre-trained with a masked language model objective and an autoregressive objective on an unsupervised source code corpus and jointly fine-tuned with a token-type prediction objective and an autoregressive objective on supervised translation tasks, wherein the first programming language and the second programming language differ.

In one aspect, the masked language model objective includes a span masking function that represents a source code snippet as ordered sequences of tokens, an ordered sequence of tokens includes a continuous sequence of unmasked tokens followed by a continuous sequence of masked tokens.

In one aspect, the one or more programs include further instructions to perform acts that: generate, by the neural transformer model with attention, a plurality of translation candidate sequences, a translation candidate sequence includes a translation of the source code snippet into the second programming language.

In an aspect, the one or more programs include further instructions to perform acts that: filter out one or more translation candidate sequences from the plurality of translation candidate sequences that are not syntactically correct. In an aspect, the one or more programs include further instructions to perform acts that: filter out one or more translation candidate sequences from the plurality of translation candidate sequences that exceed a maximum length threshold or is below a minimum length threshold. In an aspect, the one or more programs include further instructions to perform acts that: rank each of the translation candidate sequences based on a ranking score, wherein the ranking score includes a forward conditional probability and a backward conditional probability. In an aspect, the ranking score includes a forward unconditional probability. In an aspect, the ranking score includes a bilingual similarity score.

A method is disclosed that is performed on a computing device having at least one processor and a memory. The method comprises: obtaining an unsupervised training dataset of source code snippets; representing a source code snippet of the unsupervised training dataset as an ordered sequence of tokens, the ordered sequence of tokens including a contiguous sequence of unmasked tokens followed by a contiguous sequence of masked tokens; applying the unsupervised training dataset of source code snippets to pre-train a neural transformer model with attention; obtaining a plurality of supervised training data, a supervised training data including a forward translation task and a known translation task; and fine-tuning the neural transformer model with the plurality of supervised training data to train the neural transformer model to learn to translate an input source code snippet written in a first programming language into a semantically-equivalent source code snippet written in a target programming language, wherein the first programming language and the target programming language differ.

In an aspect, the method further comprises: obtaining a plurality of data augmented translation tasks, a data augmented translation task including a forward translation task and an unknown translation task; and fine-tuning the neural transformer model with the plurality of data augmented translation tasks.

In an aspect, fine-tuning the neural transformer model with the plurality of supervised training data further comprises: generating an output token from model vocabulary or from a token from input sequence via pointing.

In an aspect, the fine-tuning the neural transformer model with the plurality of data augmented translation tasks further comprises: generating an output token from model vocabulary or from a token from input sequence via pointing.

In an aspect, the plurality of supervised translation tasks includes ordered sequences of token tuples, a token tuple including an embedding representing a token and a token tuple.

In an aspect, the plurality of supervised translation tasks includes ordered sequences of token tuples, a token tuple including an embedding representing a token and a token tuple.

In an aspect, the method further comprises: classifying a replacement token for a masked token with a token type.

A device is disclosed having at least one processor and a memory. The at least one processor is configured to perform acts that: obtain a source code snippet written in a first programming language; generate a plurality of translation candidates for the source code snippet in a second programming language using a neural transformer model with attention, a translation candidate including a semantically-equivalent source code written in the second programming language; compute a rank score for each of the plurality of translation candidates, wherein the rank score includes a forward probability of a translation candidate, a backward probability, and an unconditional language probability of the translated candidate sequence, wherein the forward probability represents a probability of the translated candidate conditioned on an input sequence, wherein the backward probability represents a probability of a translation sequence generated by the neural transformer model given a translation candidate; and output the plurality of translation candidates based on the rank score.

In one aspect, the rank score further includes a bilingual similarity score. In an aspect, the at least one processor is configured to perform acts that: filters out from the plurality of translation candidates, one or more translation candidates that are syntactically incorrect, are composed of a number of tokens that exceed a maximum threshold, and/or are composed of a number of tokens that are below a minimum threshold. In an aspect, the neural transformer model with attention is jointly pre-trained with source code snippets using a mask spanning objective and autoregressive objective. In an aspect, the neural transformer model with attention is jointly fine-tuned with supervised translation tasks and data augmented translation tasks using a token-type classification objective and an autoregressive objective.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

What is claimed:

1. A system comprising:
   one or more processors; and
   a memory that stores one or more programs that are configured to be executed by the one or more processors, the one or more programs including instructions to perform acts that:
   receive an original source code snippet written in a first programming language; and
   translate the original source code snippet into a translated source code snippet in a second programming language using a transcompiler comprising a neural transformer model with attention, wherein the neural transformer model with attention is jointly pre-trained with a masked language model objective and an autoregressive objective on an unsupervised source code corpus and jointly fine-tuned with a token-type prediction objective and an autoregressive objective on supervised translation tasks, wherein the token-type prediction objective minimizes a loss function of the neural transformer model with attention based on a token type predicted by the neural transformer model with attention and a true token type, wherein the first programming language and the second programming language differ.

2. The system of claim 1, wherein the masked language model objective includes a span masking function that represents the original source code snippet as ordered sequences of tokens, wherein the ordered sequence of tokens includes a continuous sequence of unmasked tokens followed by a continuous sequence of masked tokens.

3. The system of claim 1, wherein the one or more programs include further instructions to perform acts that:
generate, by the neural transformer model with attention, a plurality of translation candidate sequences, wherein a translation candidate sequence of the plurality of translation candidate sequences includes a translation of the original source code snippet into the second programming language.

4. The system of claim 3, wherein the one or more programs include further instructions to perform acts that:
filter out one or more translation candidate sequences from the plurality of translation candidate sequences that are not syntactically correct.

5. The system of claim 4, wherein the one or more programs include further instructions to perform acts that:
filter out one or more translation candidate sequences from the plurality of translation candidate sequences that exceed a maximum length threshold or is below a minimum length threshold.

6. The system of claim 3, wherein the one or more programs include further instructions to perform acts that:
rank each of the translation candidate sequences based on a ranking score, wherein the ranking score includes a forward conditional probability and a backward conditional probability.

7. The system of claim 6, wherein the ranking score includes a forward unconditional probability.

8. The system of claim 7, wherein the ranking score includes a bilingual similarity score.

9. A device, comprising:
at least one processor and a memory;
wherein the at least one processor is configured to perform acts that:
obtain an original source code snippet written in a first programming language;
generate a plurality of translation candidates for the original source code snippet in a second programming language using a transcompiler, wherein the transcompiler comprises a neural transformer model with attention, wherein a translation candidate of the plurality of translation candidates comprises a semantically-equivalent source code written in the second programming language, wherein the first programming language differs from the second programming language;
access a source code language model trained to generate an unconditional language probability;
generate for each of the plurality of translation candidates, a forward probability, a backward probability, and an unconditional language probability, wherein the forward probability is an output probability generated by the neural transformer model with attention for the translation candidate conditioned on the original source code snippet, wherein the backward probability is an output probability generated by the neural transformer model with attention for the original source code snippet conditioned on the translation candidate, wherein the unconditional language probability is an output probability generated by the source code language model for the translation candidate unaffected by a condition;
compute, by the transcompiler, a rank score for each of the plurality of translation candidates, wherein the rank score for each translation candidate includes the forward probability of the translation candidate, a backward probability of the translation candidate, and an unconditional language probability of the translation candidate;
rank, by the transcompiler, each of the plurality of translation candidates based on a respective rank score; and
output, by the transcompiler, each of the plurality of translation candidates based on each translation candidate's rank score.

10. The device of claim 9, wherein the rank score includes a bilingual similarity score, wherein the bilingual similarity score is based on similarity of an embedding of the original source code snippet and an embedding of a translation candidate.

11. The device of claim 9, wherein the at least one processor is configured to perform acts that:
filter out from the plurality of translation candidates, one or more translation candidates that are syntactically incorrect, are composed of a number of tokens that exceed a maximum threshold, and/or are composed of a number of tokens that are below a minimum threshold.

12. The device of claim 9, wherein the neural transformer model with attention is jointly pre-trained with source code snippets using a mask spanning objective and autoregressive objective.

13. The device of claim 12, wherein the neural transformer model with attention is jointly fine-tuned with supervised translation tasks and data augmented translation tasks using a token-type classification objective and an autoregressive objective.

* * * * *